(12) United States Patent
Ishiguro et al.

(10) Patent No.: US 12,528,309 B2
(45) Date of Patent: Jan. 20, 2026

(54) DECORATIVE SHEET AND DECORATIVE MOLDED-RESIN ARTICLE

(71) Applicant: Dai Nippon Printing Co., Ltd., Tokyo (JP)

(72) Inventors: Shohei Ishiguro, Tokyo (JP); Yosuke Abe, Tokyo (JP); Masahiro Yasuhara, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 231 days.

(21) Appl. No.: 17/598,977

(22) PCT Filed: Mar. 25, 2020

(86) PCT No.: PCT/JP2020/013190
§ 371 (c)(1),
(2) Date: Sep. 28, 2021

(87) PCT Pub. No.: WO2020/203513
PCT Pub. Date: Oct. 8, 2020

(65) Prior Publication Data
US 2022/0176732 A1 Jun. 9, 2022

(30) Foreign Application Priority Data

Mar. 29, 2019 (JP) .................................. 2019-067678

(51) Int. Cl.
| | |
|---|---|
| *B32B 3/30* | (2006.01) |
| *B44C 5/04* | (2006.01) |
| *B44F 9/02* | (2006.01) |
| *B44F 9/04* | (2006.01) |

(52) U.S. Cl.
CPC ................. *B44C 5/04* (2013.01); *B32B 3/30* (2013.01); *B44F 9/02* (2013.01); *B44F 9/04* (2013.01)

(58) Field of Classification Search
CPC ... B44C 5/04; B44C 3/025; B44F 9/02; B44F 9/04; B32B 3/30; B32B 27/00; B32B 27/20
See application file for complete search history.

(56) References Cited

U.S. PATENT DOCUMENTS

| | | | | |
|---|---|---|---|---|
| 5,296,340 A | * | 3/1994 | Tsukada ................. | B32B 27/08 430/394 |
| 2010/0173132 A1 | * | 7/2010 | Furukawa ............... | B32B 27/20 428/172 |

FOREIGN PATENT DOCUMENTS

| | | |
|---|---|---|
| JP | S50-014566 A | 5/1975 |
| JP | S50-016684 A | 6/1975 |
| JP | S54-131408 A | 10/1979 |

(Continued)

OTHER PUBLICATIONS

[NPL-1] Horio et al. (JP 2014-188744 A), Oct. 6, 2014 (EPO machine translation to English). (Year: 2014).*

(Continued)

*Primary Examiner* — Donald M Flores, Jr.
(74) *Attorney, Agent, or Firm* — Troutman Pepper Locke LLP; James E. Armstrong, IV; Nicholas J. DiCeglie, Jr.

(57) ABSTRACT

Provided is a decorative sheet which combines an excellent touch with design attractiveness. The decorative sheet comprises a base layer, a protrusion layer partly disposed, and a first resin layer in this order, in which the first resin layer contains a matting agent and the layer of protrusions contains particles.

13 Claims, 3 Drawing Sheets

(56) References Cited

FOREIGN PATENT DOCUMENTS

| JP | S55-145569 | A |   | 11/1980 |
|----|------------|---|---|---------|
| JP | S61-130080 | A |   | 6/1986  |
| JP | S62-116146 | A |   | 5/1987  |
| JP | 2013-018231 | A |  | 1/2013  |
| JP | 2014188744 | A | * | 10/2014 |
| JP | 2016110035 | A | * | 6/2016  |
| JP | 2017065261 | A | * | 4/2017  |

OTHER PUBLICATIONS

[NPL-1] Uchida (JP 2016-110035 A), Jun. 20, 2016 (EPO machine translation to English). (Year: 2016).*
[NPL-3] Abe et al. (JP 2017-065261 A); Apr. 6, 2017 (EPO machine translation to English). (Year: 2017).*
International Search Report mailed Jun. 16, 2020, issued for PCT/JP2020/013190.
Office Action mailed May 11, 2021, issued for Japanese Patent Application No. 2020-573051 and English translation thereof.
Office Action issued in Chinese Patent Application No. CN 202080026036.0, mailed Jan. 10, 2024, with English translation.

* cited by examiner

DECORATIVE SHEET AND DECORATIVE MOLDED-RESIN ARTICLE

TECHNICAL FIELD

The present disclosure relates to a decorative sheet and a decorative resin molded article.

BACKGROUND ART

Decorative resin molded articles obtained by laminating a decorative sheet on the surface of a resin molded article have been heretofore used for vehicle interior and exterior parts, building interior materials, home electric appliance housings and the like. In production of such a decorative resin molded article, a molding method or the like is used in which a decorative sheet provided with a design in advance is integrated with a resin by injection molding. Typical examples of the molding method include an insert molding method in which a decorative sheet is molded into a three-dimensional shape by a vacuum molding die in advance, the decorative sheet is inserted into an injection molding die, and a fluidized resin is injected into the die to integrate the resin with the decorative sheet; and an injection molding simultaneous decorating method in which a decorative sheet inserted into a mold during injection molding is integrated with a molten resin injected into a cavity by injection molding. The decorative sheet is used not only in the method for molding by injection molding but also in a method in which the decorative sheet is bonded onto a molded product formed in advance while heat or pressure is applied as in a vacuum press-bonding method.

As a method for imparting a high realistic design feeling to a decorative resin molded article, a method including providing a decorative sheet with a resin layer containing a matting agent and a method including providing a surface of a decorative sheet with an irregularity shape, and the like are known. For example, Patent Document 1 discloses a decorative sheet in which a first resin layer containing a matting agent, a second resin layer partially provided on the first resin layer and a protrusion layer provided on the second resin layer and containing a resin and organic particles are present in this order on a base material layer. In the decorative sheet disclosed in Patent Document 1, the second resin layer is partially laminated on the first resin layer containing a matting agent, and there is a difference in gloss between a region where the second resin layer is laminated and a region where the second resin layer is not laminated, so that high designability (gloss/matte pattern) is exhibited. Further, since the protrusion layer containing a resin and organic particles is laminated on the second resin layer, an excellent touch feeling can be exhibited without impairing the gloss/matte pattern.

PRIOR ART DOCUMENT

Patent Document

Patent Document 1: Japanese Patent Laid-open Publication No. 2017-65261

SUMMARY OF THE INVENTION

Problems to be Solved by the Invention

The decorative sheet disclosed in Patent Document 1 has high designability and exhibits an excellent touch feeling.

On the other hand, when for imparting a touch feeling by providing irregularities on a surface of a decorative sheet, a protrusion layer is partially provided on a layer that imparts a gloss difference, it is necessary to consider an effect of the gloss of the protrusion layer, and the gloss of the layer that imparts a gloss difference is made close to the gloss of the protrusion layer, so that the degree of freedom in material selection may decrease). Therefore, a new technique for providing a decorative sheet excellent in both touch feeling and design feeling is required.

Under such circumstances, a main object of the present disclosure is to provide a decorative sheet excellent in both touch feeling and designability. Another object of the present disclosure is to provide a decorative resin molded article.

Means for Solving the Problem

The present disclosure provides an invention of an aspect as described below.

Item 1. A decorative sheet including at least a base material layer, a partially provided protrusion layer and a first resin layer in this order, the first resin layer containing a matting agent, the protrusion layer containing particles.

Item 2. The decorative sheet according to item 1, in which the first resin layer is formed on the entire surface on one side of the decorative sheet.

Item 3. The decorative sheet according to item 1 or 2, in which a second resin layer is provided on a side opposite to the protrusion layer side of the first resin layer.

Item 4. The decorative sheet according to any one of items 1 to 3, in which the protrusion layer contains organic particles as the particles.

Item 5. The decorative sheet according to item 4, in which the organic particle is at least one of a urethane bead and an acrylic bead.

Item 6. The decorative sheet according to any one of items 1 to 5, in which the first resin layer has a thickness of 2 µm or more and 10 µm or less.

Item 7. The decorative sheet according to any one of items 1 to 6, in which the particle contained in the protrusion layer has an average particle diameter of 15 µm or more and 60 µm or less.

Item 8. The decorative sheet according to any one of items 1 to 7, including a pattern layer between the base material layer and the protrusion layer.

Item 9. The decorative sheet according to any one of items 1 to 8, in which the average thickness of the protrusion layer is less than 50 µm.

Item 10. A decorative resin molded article including at least a molded resin layer, a base material layer, a partially provided protrusion layer and a first resin layer in this order, the first resin layer containing a matting agent, the protrusion layer containing particles.

Advantages of the Invention

According to the present disclosure, it is possible to provide a decorative sheet excellent in both touch feeling and designability. Further, according to the present disclosure, it is also possible to provide a decorative resin molded article in which the decorative sheet is used.

EMBODIMENTS OF THE INVENTION

1. Decorative Sheet

Figure 1:
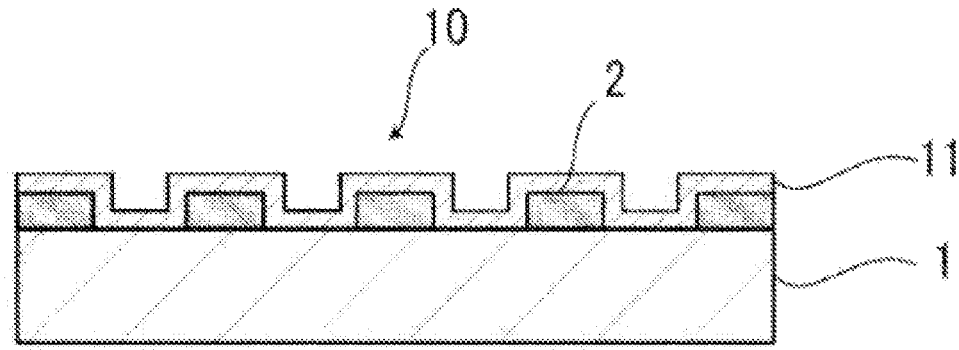
FIG. 1 is a schematic sectional view of an example of a decorative sheet of the present disclosure.

The decorative sheet of the present disclosure includes at least a base material layer, a partially provided protrusion layer and a first resin layer in this order, the first resin layer containing a matting agent, the protrusion layer containing particles. The decorative sheet of the present disclosure can be excellent in both touch feeling and designability because it has the above-mentioned configuration. More specifically, an excellent touch feeling is imparted by an irregularity shape of a surface of the decorative sheet from the protrusion layer partially provided on the base material layer, and the first resin layer containing a matting agent is formed on the protrusion layer to suppress inhibition of the design based on the first resin layer by the protrusion layer in plan view of the decorative sheet, so that a desired design can be suitably exhibited.

Hereinafter, the decorative sheet of the present disclosure will be described in detail. Regarding numerical ranges in this specification, a numerical range indicated by the term "A to B" means "A or more" and "B or less" unless the numerical range is specified by the term "or more" or "or less". For example, the expression of "2 to 15 mm" means 2 mm or more and 15 mm or less. In the present description, the "(meth)acrylate" means an "acrylate" or a "methacrylate", and the same applies to other similar terms.

Laminated Structure of Decorative Sheet

As shown in FIG. 1 to FIG. 6, the decorative sheet 10 of the present disclosure has a laminated structure in which at least a base material layer 1, a protrusion layer 2 and a first resin layer 11 are laminated in this order. The protrusion layer 2 is partially provided on the base material layer 1. A plurality of protrusion layers 2 are provided on the base material layer 1. Since a plurality of protrusion layers 2 are partially provided on the base material layer 1, a surface of the decorative sheet 10 of the present disclosure has an irregularity shape.

The first resin layer 11 is provided on at least a part of the protrusion layers 2. The first resin layer 11 is provided preferably on the entire surface of the protrusion layer 2, more preferably on the entire surface on one side of the decorative sheet 10. FIG. 1 to FIG. 6 show an aspect in which the first resin layer 11 is provided on the entire surface on one side of the decorative sheet 10.

Figure 2:
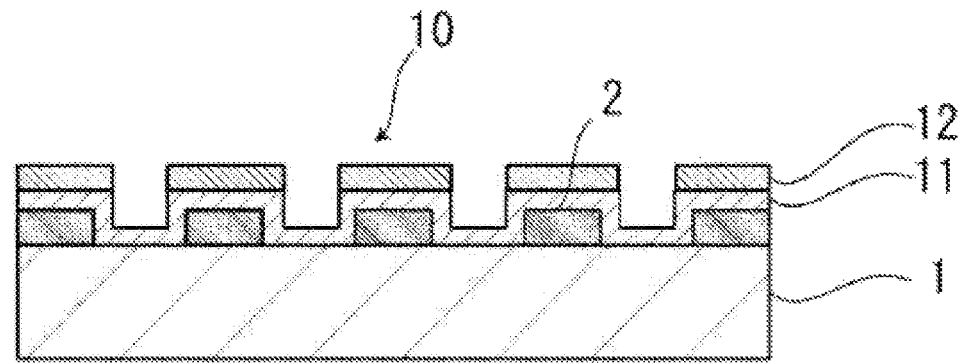
FIG. 2 is a schematic sectional view of an example of a decorative sheet of the present disclosure.
Figure 3:
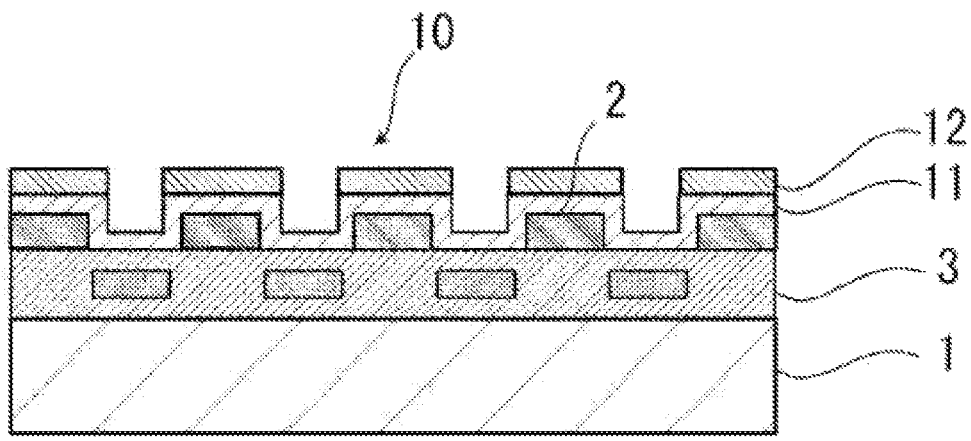
FIG. 3 is a schematic sectional view of an example of a decorative sheet of the present disclosure.
Figure 4:
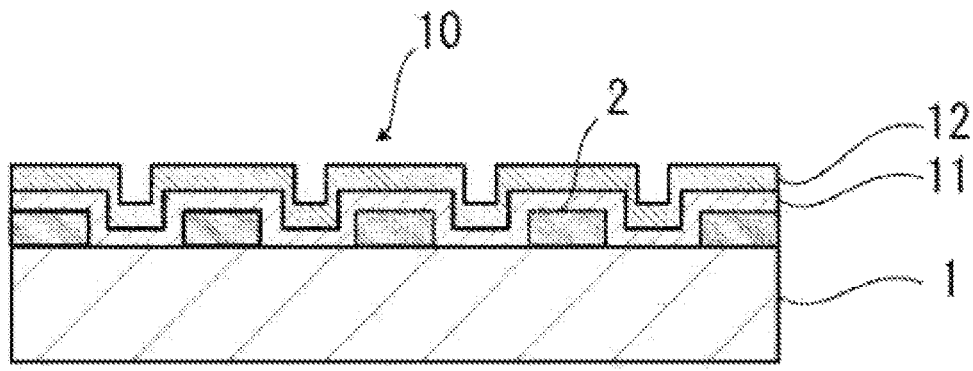
FIG. 4 is a schematic sectional view of an example of a decorative sheet of the present disclosure.
Figure 5:
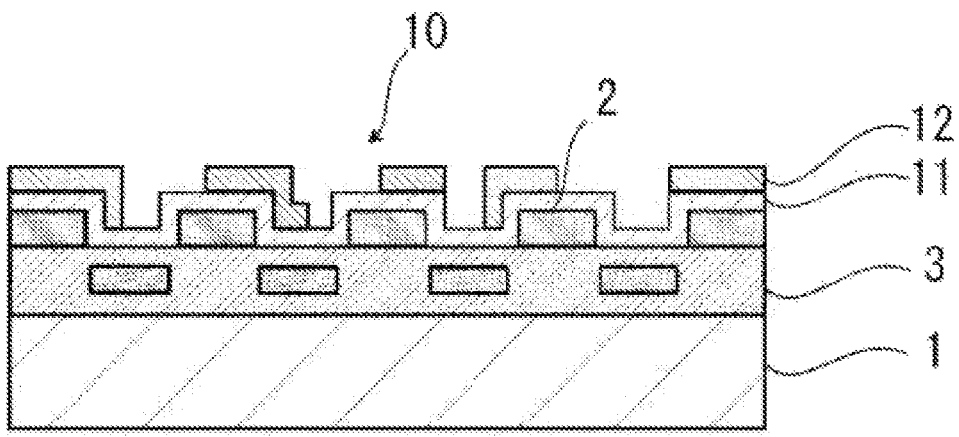
FIG. 5 is a schematic sectional view of an example of a decorative sheet of the present disclosure.
Figure 6:
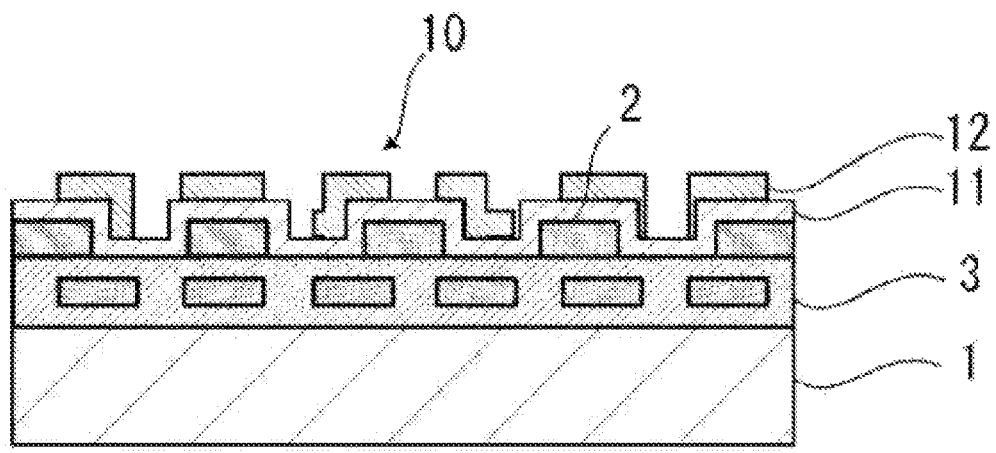
FIG. 6 is a schematic sectional view of an example of a decorative sheet of the present disclosure.
Figure 7:
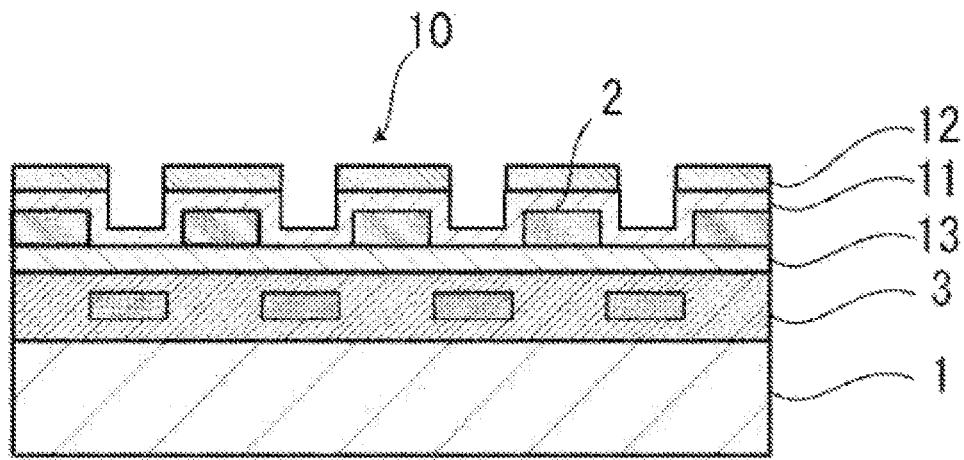
FIG. 7 is a schematic sectional view of an example of a decorative sheet of the present disclosure.

As shown in FIG. 2 to FIG. 7, a second resin layer 12 may be provided on a side opposite to the protrusion layer 2 side of the first resin layer 11 if necessary in the decorative sheet 10 of the present disclosure. The second resin layer 12 may be provided on the entire surface of the first resin layer 11 on a side opposite to the protrusion layer 2 side (see FIG. 4), or may be partially provided (see FIG. 2, FIG. 3, FIG. 5, FIG. 6 and FIG. 7). The second resin layer 12 is provided on at least a part of the first resin layer 11. FIG. 2, FIG. 3, FIG. 5, FIG. 6 and FIG. 7 show an aspect in which the second resin layer 12 is provided on a part of the first resin layer 11. More specifically, FIG. 2, FIG. 3 and FIG. 7 show an aspect in which the second resin layer 12 is provided on a part of the first resin layer 11, which is also the entire surface of the protrusion layer 2, and FIG. 5 and FIG. 6 show an aspect in which the second resin layer 12 is provided on a part of the first resin layer 11, which is also a part of the protrusion layer 2.

As shown in FIG. 7, a third resin layer 13 may be provided on the protrusion layer 2 on a side opposite to the first resin layer 11 side if necessary in the decorative sheet 10 of the present disclosure. In the decorative sheet of the present disclosure, the third resin layer 13 may be provided on the entire surface of the protrusion layers 2 on a side opposite to the first resin layer 11 side (see FIG. 7), or may be partially provided.

In the decorative sheet 10 of the present disclosure, a pattern layer 3 may be provided between the base material layer 1 and the protrusion layers 2 if necessary. The decorative sheet 10 may have a primer layer or the like provided between the protrusion layer 2 and the pattern layer 3, may have a masking layer or the like provided between the base material layer 1 and the pattern layer 3, may have a back adhesive layer or the like provided on a back surface of the base material layer (side opposite to the protrusion layer 2 side), or may have other layers provided at any position (not shown).

Examples of the laminated structure of the decorative sheet of the present disclosure include a laminated structure in which the base material layer 1, the protrusion layer 2 and the first resin layer 11 are laminated in this order; a laminated structure in which the base material layer 1, the protrusion layer 2, the first resin layer 11 and the second resin layer 12 are laminated in this order; a laminated structure in which the base material layer 1, the pattern layer 3, the protrusion layer 2 and the first resin layer 11 are laminated in this order; a laminated structure in which the base material layer 1, the pattern layer 3, the third resin layer 13, the protrusion layer 2, the first resin layer 11 and the second resin layer 12 are laminated in this order; and a laminated structure in which the base material layer 1, the pattern layer 3, the protrusion layer 2, the first resin layer 11 and the second resin layer 12 are laminated in this order. As one aspect of the laminated structure of the decorative sheet of the present disclosure, FIG. 1 shows a schematic sectional view of an example of a decorative sheet in which the base material layer 1, the protrusion layer 2 and the first resin layer 11 are laminated in this order. As one aspect of the laminated structure of the decorative sheet of the present disclosure, FIG. 2 and FIG. 4 show a schematic sectional view of an example of a decorative sheet in which the base material layer 1, the protrusion layer 2, the first resin layer 11 and the second resin layer 12 are laminated in this order. As one aspect of the laminated structure of the decorative sheet of the present disclosure, FIG. 3, FIG. 5 and FIG. 6 show a schematic sectional view of an example of a decorative sheet in which the base material layer 1, the pattern layer 3, the protrusion layer 2, the first resin layer 11 and the second resin layer 12 are laminated in this order. As one aspect of the laminated structure of the decorative sheet of the present disclosure, FIG. 7 shows a schematic sectional view of an example of a decorative sheet in which the base material layer 1, the pattern layer 3, the third resin layer 13, the protrusion layer 2, the first resin layer 11 and the second resin layer 12 are laminated in this order.

Composition of Each Layer Forming Decorative Sheet

[Base Material Layer 1]

The base material layer 1 is a resin sheet (resin film) that serves as a support in the decorative sheet of the present disclosure. The resin component which is used for the base material layer 1 is not particularly limited, and may be appropriately selected according to moldability, compatibility with a molded resin, and the like, and a resin film composed of a thermoplastic resin is preferable. Specific examples of the thermoplastic resin include acrylonitrile-butadiene-styrene resins (hereinafter, sometimes referred to as "ABS resins"), acrylonitrile-styrene-acrylic acid ester resins (hereinafter, sometimes referred to as "ASA resins"), acrylic resins, polyolefin resins such as polypropylene and polyethylene, polycarbonate resins, vinyl chloride resins and polyethylene terephthalate (PET). Among them, ABS resins and acrylic resins are preferable from the viewpoint of moldability. In addition, the base material layer 1 may be formed of a single-layer sheet of any of these resins, or may be formed of a multiple-layer sheet of the same kind or different kinds of resins.

The bending elastic modulus of the base material layer 1 is not particularly limited. For example, when the decorative sheet of the present disclosure is integrated with a molded resin by an insert molding method, the bending elastic modulus of the base material layer 1 in the decorative sheet of the present disclosure at 25° C. is 500 to 4,000 MPa, preferably 750 to 3,000 MPa. Here, the bending elastic modulus at 25° C. is a value measured in accordance with JIS K 7171:2016. When the bending elastic modulus at 25° C. is 500 MPa or more, the decorative sheet has sufficient rigidity, and has further good surface characteristics and moldability even when subjected to an insert molding method. In addition, when the bending elastic modulus at 25° C. is 4,000 MPa or less, a sufficient tension can be applied in production by a roll-to-roll method, and sagging is less likely to occur, so that pictures can be printed on one top of another without being misaligned, and so-called picture registration is improved.

One surface or both surfaces of the base material layer 1 may be subjected to surface treatment in order to improve adhesion to a layer provided thereon. Examples of the surface treatment include chemical surface treatments such as an oxidation method and physical surface treatments such as a surface roughening method. Examples of the oxidation method include corona discharge treatment, chromium oxidation treatment, flame treatment, hot air treatment and ozone ultraviolet treatment methods. Examples of the surface roughening method include a sandblasting method and a solvent treatment method. These surface treatments are appropriately selected according to the type of resin component forming the base material layer 1, and a corona discharge treatment method is preferable from the viewpoint of an effect, handling characteristics and the like.

The base material layer 1 may be subjected to treatment such as formation of a known adhesive layer.

Further, the base material layer 1 may be colored using a colorant, or is not required to be colored. In addition, the base material layer 1 may be opaque, colorless and transparent, colored and transparent, or translucent. The colorant which is used for the base material layer 1 is not particularly limited, and is preferably a colorant that is not discolored even under a temperature condition of 150° C. or higher, and specific examples thereof include existing dry colors, paste colors and masterbatch resin compositions.

The thickness of the base material layer 1 is appropriately set according to a use of the decorative sheet, a molding method for integration with a molded resin, or the like, and is normally about 25 to 1000 μm or about 50 to 700 μm. More specifically, when the decorative sheet of the present disclosure is subjected to an insert molding method, the thickness of the base material layer 1 is normally about 50 to 1000 μm, preferably about 100 to 700 μm, more preferably about 100 to 500 μm. In addition, when the decorative sheet of the present disclosure is subjected to an injection molding simultaneous decorating method, the thickness of the base material layer 1 is normally about 25 to 200 μm, preferably about 50 to 200 μm, more preferably about 70 to 200 μm.

[Protrusion Layer 2]

In the decorative sheet of the present disclosure, the protrusion layer 2 containing particles are formed on the base material layer 1. It is preferable that the protrusion layers 2 in the present disclosure is formed as a so-called protrusion print layer by protrusion printing so as to impart a desired touch feeling based on the irregularity shape to a surface of the decorative sheet. In the present disclosure, the protrusion layer 2 is in a form indicated by a convex shape in a schematic sectional views as shown in FIG. 1 to FIG. 7, and examples thereof include a form in which a conical or columnar protrusion is formed on a surface of the decorative sheet; and a form in which like a vessel pattern, a linearly extending protrusion is formed.

The average thickness (height) of the protrusion layers 2 of the decorative sheet of the present disclosure is preferably 5 μm or more, more preferably 10 μm or more, still more preferably 15 μm or more, particularly preferably 20 μm or more from the viewpoint of exhibiting an excellent touch feeling in the decorative sheet in which the first resin layer 11 and the second resin layer 12 if necessary are laminated on the protrusion layers 2. In addition, the preferred upper limit of the average thickness of the protrusion layers 2 is preferably 50 μm or less, more preferably less than 50 μm, still more preferably 40 μm or less. By setting the average thickness of the protrusion layers 2 within the above-described range, the touch feeling and designability of the decorative sheet can be more suitably improved. In the present description, the average thickness of the protrusion layers 2 is a value obtained by observing a cross-section of the decorative sheet with a scanning electron microscope (SEM) and calculating ten measured values as an average value. Observation with a scanning electron microscope (SEM) is performed under the conditions of an acceleration voltage of 3.0 kV and a magnification of 50,000 times.

The resin for forming the protrusion layers 2 is preferably a curable resin such as a thermosetting resin or an ionizing-radiation-curable resin (e.g. electron beam-curable resin) from the viewpoint of suppressing deformation of the protrusion layers 2 to obtain a desired shape. In particular, the ionizing-radiation-curable resin is preferable from the viewpoint of high surface hardness, productivity and the like.

Examples of the thermosetting resin include unsaturated polyester resins, polyurethane resins (including two-liquid curable polyurethane), epoxy resins, aminoalkyd resins, phenol resins, urea resins, diallyl phthalate resins, melamine resins, guanamine resins, melamine-urea co-condensation resins, silicone resins and polysiloxane resins.

A curing agent such as a crosslinker or a polymerization initiator, and a polymerization accelerator can be added to the resin. For example, as a curing agent, isocyanate, an organic sulfonate or the like can be added to an unsaturated polyester resin, a polyurethane resin or the like, and an organic amine or the like can be added to an epoxy resin. A peroxide such as methyl ethyl ketone peroxide and a radical initiator such as azoisobutylnitrile can be added to the unsaturated polyester resin.

Examples of the method for forming the protrusion layer 2 with the thermosetting resin include a method in which a thermosetting resin solution is applied by a coating method such as a roll coating method, a gravure coating method, a gravure printing method or a silk screen printing method, dried and cured.

The ionizing radiation curable resin is a resin that is crosslinked and cured when irradiated with an ionizing radiation, and specific examples thereof include those in which at least one of prepolymers, oligomers and monomers each having a polymerizable unsaturated bond or an epoxy group in the molecule is appropriately mixed. Here, the ionizing radiation means an electromagnetic wave or charged particle ray having an energy quantum capable of polymerizing or crosslinking a molecule, and normally an ultraviolet (UV) ray or an electron beam (EB) is used, but the ionizing radiations also include electromagnetic waves such as an X-ray and a γ-ray, and charged particle rays such as an α-ray and an ion beam. Among ionizing radiation curable resins, electron beam-curable resins are suitably used in formation of the protrusion layer 2 because they can be made solventless, do not require an initiator for photo-polymerization, and exhibit stable curing characteristics.

<Ionizing Radiation Curable Resin>

As the monomer which is used as an ionizing radiation curable resin, (meth)acrylate monomers having a radical-polymerizable unsaturated group in the molecule are suitable, and among them, polyfunctional (meth)acrylate monomers are preferable. The polyfunctional (meth)acrylate monomer may be a (meth)acrylate monomer having two or more polymerizable unsaturated bonds in the molecule (di- or more functional), preferably three or more polymerizable unsaturated bonds in the molecule (tri- or more functional). Specific examples of the polyfunctional (meth)acrylate include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta(meth)acrylate, dipentaerythritol hexa(meth)acrylate, ethylene oxide-modified dipentaerythritol hexa(meth)acrylate and caprolactone-modified dipentaerythritol hexa(meth)acrylate. These monomers may be used alone, or may be used in combination of two or more thereof.

As the oligomer which is used as an ionizing radiation curable resin, (meth)acrylate oligomers having a radical-polymerizable unsaturated group in the molecule are suitable, and among them, polyfunctional (meth)acrylate oligomers having two or more polymerizable unsaturated bonds in the molecule (di-or-more functional) are preferable. Examples of the polyfunctional (meth)acrylate oligomer include polycarbonate (meth)acrylate, acrylic silicone (meth)acrylate, urethane (meth)acrylate, epoxy (meth)acrylate, polyester (meth)acrylate, polyether (meth)acrylate, polybutadiene (meth)acrylate, silicone (meth)acrylate, and oligomers having a cation-polymerizable functional group in the molecule (e.g. novolac-type epoxy resins, bisphenol-type epoxy resins, aliphatic vinyl ethers, aromatic vinyl ethers and so on). Here, the polycarbonate (meth)acrylate is not particularly limited as long as it has a carbonate bond on the polymer main chain, and has a (meth)acrylate group at the end or side chain, and the polycarbonate (meth)acrylate can be obtained by esterifying a polycarbonate polyol with (meth)acrylic acid. The polycarbonate (meth)acrylate may be, for example, urethane (meth)acrylate having a polycarbonate backbone. The urethane (meth)acrylate having a polycarbonate backbone is obtained by, for example, reacting a polycarbonate polyol, a polyvalent isocyanate compound and hydroxy (meth)acrylate. The acrylic silicone (meth)acrylate can be obtained by radical-copolymerizing a silicone macro-monomer with a (meth)acrylate monomer. The urethane (meth)acrylate can be obtained by, for example, esterifying a polyurethane oligomer with (meth)acrylic acid, the polyurethane oligomer being obtained by reaction of a polyether polyol or a polyester polyol with a polyisocyanate compound. The epoxy (meth)acrylate can be obtained by, for example, reacting (meth)acrylic acid with an oxirane ring of a relatively low-molecular-weight bisphenol-type epoxy resin or novolac-type epoxy resin to perform esterification. Carboxyl-modified epoxy (meth)acrylate obtained by partially modifying the epoxy (meth)acrylate with a dibasic carboxylic anhydride can also be used. For example, the polyester (meth)acrylate can be obtained by esterifying hydroxyl groups of a polyester oligomer with (meth)acrylic acid, the polyester oligomer being obtained by condensation of a polyvalent carboxylic acid and a polyhydric alcohol and having a hydroxyl group at each of both ends, or by esterifying a hydroxyl group at the end of an oligomer with (meth)acrylic acid, the oligomer being obtained by adding an alkylene oxide to a polyvalent carboxylic acid. The polyether (meth)acrylate can be obtained by esterifying a hydroxyl group of a polyether polyol with (meth)acrylic acid. The polybutadiene (meth)acrylate can be obtained by adding (meth)acrylic acid to the side chain of a polybutadiene oligomer. The silicone (meth)acrylate can be obtained by adding (meth)acrylic acid to the end or side chain of a silicone having a polysiloxane bond in the main chain. Among them, polycarbonate (meth)acrylate, urethane (meth)acrylate and the like are especially preferable as polyfunctional (meth)acrylate oligomers. These oligomers may be used alone, or may be used in combination of two or more thereof.

When the decorative sheet is used for production of a decorative resin molded article, etc. and thus required to have three-dimensional moldability, it is preferable to use a polyfunctional polycarbonate (meth)acrylate among the above-mentioned ionizing-radiation-curable resins from the viewpoint of obtaining excellent three-dimensional moldability. From the viewpoint of achieving both three-dimensional moldability and scratch resistance, it is more preferable to use a combination of a polyfunctional polycarbonate (meth) acrylate and a polyfunctional (meth) acrylate. In addition, when a polyfunctional (meth)acrylate monomer is used as the ionizing-radiation-curable resin, it is preferably to use the monomer in combination with a thermoplastic resin such as an acrylic resin from the viewpoint of obtaining excellent three-dimensional moldability, and it is more preferable that the mass ratio of the polyfunctional (meth)acrylate monomer and the thermoplastic resin in the ionizing radiation curable resin composition is 25:75 to 75:25 from the viewpoint of achieving both three-dimensional moldability and scratch resistance. Hereinafter, the polyfunctional polycarbonate (meth)acrylate and the polyfunctional (meth)acrylate will be described in detail.

<Polyfunctional Polycarbonate (Meth)Acrylate>

The polyfunctional polycarbonate (meth)acrylate is not particularly limited as long as it has a carbonate bond on the polymer main chain and two or more (meth)acrylates at the terminal or on the side chain. In addition, the number of functional groups per molecule of the (meth)acrylate is preferably 2 to 6 from the viewpoint of improving cross-linking and curing. The polyfunctional polycarbonate (meth) acrylates may be used alone, or may be used in combination of two or more thereof.

The polyfunctional polycarbonate (meth)acrylate is obtained by, for example, converting some or all of hydroxyl groups of a polycarbonate polyol into a (meth)acrylate (acrylic acid ester or methacrylic acid ester). The esterification reaction can be carried out by a usual esterification reaction. Examples thereof include 1) a method in which a polycarbonate polyol and an acrylic acid halide or methacrylic acid halide are condensed in the presence of a base; 2) a method in which a polycarbonate polyol and an acrylic anhydride or methacrylic anhydride are condensed in the presence of a catalyst; and 3) a method in which a polycarbonate polyol and an acrylic acid or methacrylic acid are condensed in the presence of an acid catalyst.

The polycarbonate polyol is a polymer having a carbonate bond in the polymer main chain, and having 2 or more, preferably 2 to 50, more preferably 3 to 50 hydroxyl groups at the end or side chain. Examples of the typical method for producing the polycarbonate polyol include a method using a polycondensation reaction of a diol compound (A), a polyhydric alcohol (B) of tri- or more valence, and a compound (C) as a carbonyl component.

The diol compound (A) which is used as a raw material for the polycarbonate polyol is represented by the general formula HO—$R^1$—OH. Here, $R^1$ is a divalent hydrocarbon with a carbon number of 2 to 20, and may include an ether bond in the group. $R^1$ is, for example, a linear or branched alkylene group, a cyclohexylene group or a phenylene group.

Specific examples of the diol compound include ethylene glycol, 1,2-propylene glycol, diethylene glycol, dipropylene glycol, triethylene glycol, polyethylene glycol, neopentyl glycol, 1,3-propanediol, 1,4-butanediol, 1,5-pentanediol, 3-methyl-L5-pentanediol, 1,6-hexanediol, 1,8-octanediol, 1,3-bis(2-hydroxyethoxy)benzene, 1,4-bis(2-hydroxyethoxy)benzene, neopentyl glycol, 1,4-cyclohexanediol and 1,4-cyclohexanedimethanol. These diols may be used alone, or may be used in combination of two or more thereof.

Examples of the polyhydric alcohol (B) of tri- or more valence which is used as a raw material for the polycarbonate polyol include alcohols such as trimethylolpropane, trimethylolethane, pentaerythritol, ditrimethylolpropane, dipentaerythritol, glycerin and sorbitol. In addition, the polyhydric alcohol of tri- or more valence may be an alcohol having a hydroxyl group with 1 to 5 equivalents of ethylene oxide, propylene oxide or other alkylene oxide added to the hydroxyl group of the polyhydric alcohol. These colorants may be used alone, or may be used in combination of two or more thereof.

The compound (C) as a carbonyl component which is used as a raw material for the polycarbonate polyol is any compound selected from a carbonic acid diester, phosgene and an equivalent thereof. Specific examples of the compound include carbonic acid diesters such as dimethyl carbonate, diethyl carbonate, diisopropyl carbonate, diphenyl carbonate, ethylene carbonate and propylene carbonate; phosgene; and halogenated formic acid esters such as methyl chloroformate, ethyl chloroformate and phenyl chloroformate. These compounds may be used alone, or may be used in combination of two or more thereof.

The polycarbonate polyol is synthesized subjecting a diol compound (A), a polyhydric alcohol (B) of tri- or more valence, and a compound (C) as a carbonyl component to a polycondensation reaction under general conditions. The charged molar ratio of the diol compound (A) and the polyhydric alcohol (B) may be set within the range of, for example, 50:50 to 99:1. In addition, the charged molar ratio of the compound (C) as a carbonyl component to the diol compound (A) and the polyhydric alcohol (B) may be set within the range of, for example, 0.2 to 2 equivalents to the hydroxyl groups of the diol compound and the polyhydric alcohol.

The equivalent number (eq./mol) of hydroxyl groups existing in the polycarbonate polyol after the polycondensation reaction with the above-mentioned charged ratio is, for example, 3 or more, preferably 3 to 50, more preferably 3 to 20 on average in one molecule. When the equivalent number is in a range as described above, a necessary amount of (meth)acrylate groups are formed through an esterification reaction as described later, and moderate flexibility is imparted to the polyfunctional polycarbonate (meth)acrylate resin. The terminal functional groups of the polycarbonate polyol are usually OH groups, but some of them may be carbonate groups.

The method for producing a polycarbonate polyol as described above is described in, for example, Japanese Patent Laid-open Publication No. S64-1726. The polycarbonate polyol can also be produced through an ester exchange reaction of a polycarbonate diol and a polyhydric alcohol of tri- or more valence as described in Japanese Patent Laid-Open Publication No. H03-181517.

The molecular weight of the polyfunctional polycarbonate (meth)acrylate is not particularly limited, and for example, the weight average molecular weight is 5,000 or more, preferably 10,000 or more. The upper limit of the weight average molecular weight of the polyfunctional polycarbonate (meth)acrylate is not particularly limited, and is, for example, 100,000 or less, preferably 50,000 or less, from the viewpoint of performing control so that the viscosity is not excessively high. The weight average molecular weight of the polyfunctional polycarbonate (meth)acrylate is preferably 10,000 to 50,000, more preferably 10,000 to 20,000.

The weight average molecular weight of the polyfunctional polycarbonate (meth)acrylate in the present description is a value obtained by performing measurement using a gel permeation chromatography method using polystyrene as a standard substance.

The content of the polyfunctional polycarbonate (meth) acrylate in the ionizing radiation curable resin composition which is used for formation of the protrusion layer 2 is not particularly limited as long as the effects of the present disclosure are exhibited, and the content is preferably 50 mass % or more, more preferably 80 mass % or more, still more preferably 85 mass % or more, from the viewpoint of ensuring that despite heat and pressure during injection molding, etc., an irregularity shape formed by the protrusion layers 2 is maintained and deterioration of a high realistic design feeling presented on the decorative sheet is more effectively suppressed.

<Polyfunctional (Meth)Acrylate>

The polyfunctional (meth)acrylate is not particularly limited, and a polyfunctional urethane (meth)acrylate is preferable. The polyfunctional urethane (meth)acrylate is not particularly limited as long as it has a urethane bond on the polymer main chain and two or more (meth)acrylates at the terminal or on the side chain. Such a polyfunctional urethane (meth)acrylate can be obtained by, for example, esterifying a polyurethane oligomer with (meth)acrylic acid, the polyurethane oligomer being obtained by reaction of a polyether polyol or a polyester polyol with a polyisocyanate. In addition, the number of functional groups per molecule of the polyfunctional urethane (meth)acrylate is preferably 2 to 12 from the viewpoint of improving crosslinking and curing. In addition, the functional (meth)acrylate may be one modified with silicone. The polyfunctional (meth)acrylates may be used alone, or may be used in combination of two or more thereof.

The molecular weight of the polyfunctional (meth)acrylate is not particularly limited, and for example, the weight average molecular weight is 2,000 or more, preferably 5,000 or more. The upper limit of the weight average molecular weight of the polyfunctional (meth)acrylate is not particularly limited, and is, for example, 30,000 or less, preferably 10,000 or less, from the viewpoint of performing control so that the viscosity is not excessively high.

The weight average molecular weight of the polyfunctional (meth)acrylate in the present description is a value obtained by performing measurement using a gel permeation chromatography method using polystyrene as a standard substance.

The content of the polyfunctional (meth)acrylate in the ionizing radiation curable resin composition which is used for formation of the protrusion layer 2 is not particularly limited as long as the effects of the present disclosure are exhibited, and the content is preferably 50 mass % or less, more preferably 20 mass % or less, still more preferably 15 mass % or less, from the viewpoint of ensuring that despite heat and pressure during injection molding, etc., an irregularity shape formed by the protrusion layers 2 is maintained and deterioration of a high realistic design feeling presented on the decorative sheet is more effectively suppressed.

When the polyfunctional polycarbonate (meth)acrylate and the polyfunctional (meth)acrylate are used in combination in the ionizing radiation curable resin composition which is used for formation of the protrusion layer 2, the mass ratio thereof (polyfunctional polycarbonate (meth)acrylate:polyfunctional (meth)acrylate) is preferably about 50:50 to 99:1, more preferably about 80:20 to 99:1, still more preferably about 85:15 to 99:1.

The formation of the protrusion layer 2 is performed by, for example, preparing the ionizing radiation curable resin composition, applying the resin composition, and crosslinking and curing the resin composition. The viscosity of the ionizing radiation curable resin composition may be a viscosity that allows an uncured resin layer to be formed on a layer adjacent to the protrusion layer 2 by an application method as described later. In the present disclosure, an uncured resin layer is formed by applying a prepared application liquid onto a layer adjacent to the protrusion layer 2 by a known method such as gravure coating, bar coating, roll coating, reverse roll coating or comma coating, preferably gravure coating so that the above-mentioned desired thickness is obtained. The uncured resin layer formed in this manner is irradiated with an ionizing radiation such as an electron beam or an ultraviolet ray to cure the uncured resin layer, so that the protrusion layer 2 is formed. Here, when an electron beam is used as the ionizing radiation, an accelerating voltage thereof can be appropriately selected according to a resin used and a thickness of the layer, and the accelerating voltage is normally about 70 to 300 kV.

In irradiation of an electron beam, the transmission capacity increases as the accelerating voltage becomes higher, and therefore when a resin that is easily degraded by irradiation of an electron beam is used in a layer under the protrusion layer 2, an accelerating voltage is selected so that the transmission depth of the electron beam is substantially equal to the thickness of the protrusion layer 2. Accordingly, a layer situated under the protrusion layer 2 can be inhibited from being excessively irradiated with an electron beam, so that degradation of the layers by an excessive electron beam can be minimized. The amount of radiation is preferably an amount with which the crosslinking density of the protrusion layer 2 is saturated, and the amount of radiation is selected within a range of normally 5 to 300 kGy (0.5 to 30 Mrad), preferably 10 to 50 kGy (1 to 5 Mrad). Further, the electron beam source is not particularly limited, and various kinds of electron beam accelerators can be used such as, for example, those of Cockcroft-Walton type, van de graaff type, tuned transformer type, insulated core transformer type, linear type, dynamitron type and high frequency type. When an ultraviolet ray is used as the ionizing radiation, it is practical to radiate light including an ultraviolet ray having a wavelength of 190 to 380 nm. The ultraviolet ray source is not particularly limited, and examples thereof include high-pressure mercury lamps, low-pressure mercury lamps, metal halide lamps and carbon arc lamps.

The protrusion layer 2 contains particles. Since the protrusion layer 2 contain particles, the protrusion layer 2 can suitably contribute to achievement of both an excellent touch feeling and excellent designability without forming the protrusion layer 2 with a large thick. The values of the average thickness of the protrusion layers 2 and the average particle diameter of the particles can be similar to each other. That is, the average particle diameter of the particles is preferably 5 μm or more, more preferably 10 μm or more, still more preferably 15 μm or more, even more preferably 20 μm or more from the viewpoint of exhibiting an excellent touch feeling in the decorative sheet of the present disclosure. The preferred upper limit of the average particle diameter is preferably 60 μm or less, more preferably 50 μm or less, still more preferably less than 50 μm, even more preferably 40 μm or less, particularly preferably 35 μm or less. When the average particle diameter of the particles contained in the protrusion layer 2 is set within the above-described range, the touch feeling and the designability of the decorative sheet can be more suitably improved.

The particles contained in the protrusion layer 2 are not particularly limited, and may be either organic particles or inorganic particles, and are particularly preferably organic particles from the viewpoint of achieving both an excellent touch feeling and excellent designability.

The organic particles are not particularly limited, and normally resin beads are used. Examples of the resin beads include acrylic beads, urethane beads, nylon beads and styrene beads. Among them, acrylic beads or urethane beads are preferably used from the viewpoint of suppressing whitening of the protrusion layer 2, imparting an excellent touch feeling, and improving the scratch resistance of the decorative sheet. In particular, acrylic beads or urethane beads are preferably used from the viewpoint of suppressing whitening of the protrusion layers 2, and urethane beads are preferably used from the viewpoint of enhancing scratch resistance. From the viewpoint of imparting an excellent touch feeling and improving the scratch resistance of the protrusion layer 2, it is preferable to use crosslinked resin beads. Specific examples of the crosslinked resin beads include crosslinked acrylic beads and crosslinked urethane beads.

The average particle diameter of the organic particles contained in the protrusion layer 2 is preferably 15 µm or more, more preferably 20 µm or more. The preferred upper limit of the average particle diameter is preferably 60 µm or less, more preferably 50 µm or less, still more preferably less than 50 µm, even more preferably 40 µm or less, particularly preferably 35 µm or less. The particle diameter of the organic particle is preferably in the range of 5 to 60 µm, 4 to 50 µm, 5 µm or more and less than 60 µm, 3 to 40 µm, 10 to 80 µm, or the like. It is preferable that at least 90% or more, on a number basis, of the organic particles contained in the protrusion layer 2 satisfy these particle diameters from the viewpoint of suitably exhibiting the effects of the present disclosure. If the average particle diameter of the organic particles is less than 15 µm, it may be impossible to obtain an excellent touch feeling. In addition, if the average particle diameter of the organic particles exceeds 60 µm, there is a possibility that production stability is deteriorated, so that it is difficult to form the protrusion layers 2 having a desired shape with good reproducibility. In the present disclosure, the average thickness of the protrusion layers 2 is close to the average particle diameter of the organic particles because the organic resin is uniformly distributed. When the protrusion layer 2 is formed by protrusion printing, the average particle diameter of the organic particles in the protrusion layer 2 is preferably ½ or less of the plate depth from the viewpoint of ink transfer stability. In the present disclosure, the average particle diameter means an average value (arithmetic average diameter) of particle diameters measured for non-aggregates of 100 particles randomly selected when a cross-section in a thickness direction of the layer is observed with a scanning electron microscope (SEM) under the conditions of an accelerating voltage of 3.0 kV and a magnification of 50,000 times.

The decorative sheet of the present disclosure contains the organic particles in a proportion of preferably 50 mass % or less, more preferably 40 mass % or less based on the solid content of the resin composition forming the protrusion layers 2. When the content of the organic particles is 50 mass % or less, the organic particles are uniformly distributed on the coating film (protrusion layer 2), so that the touch feeling is stabilized. If the content of the organic particles is more than 50 mass %, the organic particles are aggregated, there is a possibility that the average thickness of the protrusion layer is not stable, and the transparency of the protrusion layers 2 may be impaired, leading to deterioration of designability. The content of the organic particles is preferably 2 mass %, and more preferably 10 mass % or more. If the content of the organic particles is less than 2 mass %, there is a possibility that the touch feeling is insufficient, and the thixotropic property of the resin composition forming the protrusion layers is insufficient, so that it is difficult to form the protrusion layers 2 by protrusion printing.

The inorganic particles are not particularly limited as long as they are particles formed of an inorganic compound, and examples thereof include silica particles, calcium carbonate particles, barium sulfate particles, alumina particles and glass balloon particles, and among them, silica particles are preferable. The inorganic particles may be used alone, or may be used in combination of two or more thereof. The average particle diameter of the inorganic particles is, for example, about 0.5 to 20 µm, preferably about 1 to 10 µm.

As described above, the average particle diameter of the inorganic particles means an average value (arithmetic average diameter) of particle diameters measured for non-aggregates of 100 particles randomly selected when a cross-section in a thickness direction of the layer is observed with a scanning electron microscope (SEM) under the conditions of an accelerating voltage of 3.0 kV and a magnification of 50,000 times.

When the protrusion layer 2 contains inorganic particles, the content of the inorganic particles is not particularly limited, and is preferably about 1 to 60 parts by mass, more preferably about 1 to 40 parts by mass based on 100 parts by mass of the resin contained in the protrusion layer 2. The inorganic particles may be used alone, or may be used in combination of two or more thereof.

Various additives can be blended in the protrusion layers 2 according to desired physical properties to be imparted to the protrusion layers 2. Examples of the additives include weather resistance improving agents such as ultraviolet absorbents and light stabilizers, abrasion resistance improvers, polymerization inhibitors, crosslinkers, infrared absorbers, antistatic agents, bondability improvers, leveling agents, thixotropy imparting agents, coupling agents, plasticizers, antifoaming agents, fillers, solvents and colorants. These additives can be appropriately selected from those that are commonly used. As the ultraviolet absorbent and light stabilizer, a reactive ultraviolet absorbent and light stabilizer having a polymerizable group such as a (meth)acryloyl group in the molecule can also be used.

In the decorative sheet 10 of the present disclosure, the ratio of the area of a part provided with the protrusion layers 2 is preferably 3 to 80%, more preferably 3 to 50%, still more preferably 5 to 50%, even more preferably 5 to 40%, even more preferably 6 to 30% where the area of a surface on one side of the base material layer 1 is defined as 100%. By providing the protrusion layer 2 while the above-described range is satisfied, a decorative sheet having a more excellent touch feeling can be obtained. Here, when the upper surface and the lower surface of the protrusion layer 2 have different areas as in the case where the cross-section of the protrusion layer 2 has a trapezoidal or conical shape, the area of a part provided with the protrusion layer 2 the area of a surface of the protrusion layer 2 on the base material layer 1 side.

When the decorative sheet of the present disclosure is used for injection molding or vacuum molding, it is preferable to use polycarbonate (meth)acrylate as the ionizing radiation curable resin forming the protrusion layer 2 from the viewpoint of suppressing deformation of the protrusion layers 2 to obtain a desired shape and improving three-dimensional moldability as described above.

In addition, when the decorative sheet of the present disclosure is used for injection molding or vacuum molding, it is preferable to form the protrusion layer 2 from a mixture of an ionizing radiation curable resin and a thermoplastic resin from the viewpoint of enhancing the scratch resistance and improving the three-dimensional moldability of the decorative sheet. The type of the thermoplastic resin and the preferable mixing ratio of the ionizing radiation curable resin and the thermoplastic resin can be the same as those described for the later-described first resin layer 11.

[First Resin Layer 11]

The first resin layer 11 has the first resin layer 11 containing a matting agent for the purpose of, for example, adjusting the gloss of the decorative sheet 10. In the decorative sheet 10 of the present disclosure, the first resin layer 11 is provided on at least a part of the protrusion layer 2. The first resin layer 11 is provided preferably on the entire surface of the protrusion layer 2, more preferably on the entire surface on one side of the decorative sheet 10 (i.e. a solid layer is provided on the entire surface). FIG. 1 to FIG. 7 show an aspect in which the first resin layer 11 is provided on the entire surface on one side of the decorative sheet 10. The first resin layer 11 is preferably in contact with the protrusion layers 2. When the decorative sheet 10 has the second resin layer 12, the first resin layer 11 is preferably in contact with the second resin layer 12.

Examples of the resin that forms the first resin layer 11 include phenol resins, urea resins, diallyl phthalate, melamine resins, guanamine resins, unsaturated polyester resins, polyurethane resins, epoxy resins, aminoalkyd resins, melamine-urea co-condensates, silicone resins, polysiloxane, polyethylene terephthalate, polybutylene terephthalate, polyamide, polyethylene, polypropylene, ethylene-vinyl acetate copolymers, ethylene-acrylic acid copolymers, ethylene-acrylic acid ester copolymers, ionomers, polymethylpentene, acrylic acid esters, methacrylic acid esters, polycarbonate and cellulose triacetate.

In addition, the first resin layer 11 may be formed using an ionizing radiation curable resin. Examples of details of the ionizing radiation curable resin include the same as those described in detail in the section [Protrusion layer 2].

The first resin layer 11 contains a matting agent. The matting agent is not particularly limited, and known matting agents can be widely used. Examples of the matting agent include inorganic particles such as particles of silica, alumina, calcium carbonate, magnesium carbonate, aluminosilicate and barium sulfate, and resin (organic substance) particles such as acrylic beads, and particles of polyethylene, urethane resin, polycarbonate and polyamide (nylon). The average particle diameter of the particles is preferably 0.5 to 20 µm, more preferably 0.5 to 10 µm. The added amount of the matting agent is preferably 2 to 40 mass %, more preferably 5 to 30 mass % based on the resin composition (excluding the solvent) that forms the first resin layer 11. The shape of the particles is a polyhedral shape, a spherical shape, a scaly shape or the like. Among the inorganic particles and the organic particles, silica particles are preferable.

For the thickness of the first resin layer 11, it is preferable to adjust the touch feeling based on the irregularity shape in consideration of the average thickness of the protrusion layers 2, etc. From such a viewpoint, the thickness of the first resin layer 11 is preferably about 2 to 10 µm, more preferably about 0.1 to 20 µm, still more preferably about 0.3 to 10 µm, even more preferably about 0.5 to 5 µm. The thickness of the first resin layer 11 means the thickness of the first resin layer 11 which is not located on the protrusion layer 2.

When the decorative sheet of the present disclosure is used for injection molding or vacuum molding, it is preferable to use the polycarbonate (meth)acrylate as the ionizing radiation curable resin forming the first resin layer 11 from the viewpoint of enhancing the scratch resistance and improving the three-dimensional moldability of the decorative sheet.

In addition, when the decorative sheet of the present disclosure is used for injection molding or vacuum molding, it is preferable to form the first resin layer 11 from a mixture of an ionizing radiation curable resin and a thermoplastic resin from the viewpoint of enhancing the scratch resistance and improving the three-dimensional moldability of the decorative sheet. Examples of the thermoplastic resin include acrylic resins, urethane resins and olefin resins, and acrylic resins are particularly preferable. The mixing ratio of the ionizing radiation curable resin and the thermoplastic resin is preferably about 10:90 to 75:25, more preferably about 25:75 to 50:50 in terms of mass ratio.

[Second Resin Layer 12]

The decorative sheet 10 of the present disclosure may have the second resin layer 12 on a part or the entirety of a surface thereof if necessary for the purpose of, for example, adjusting the gloss. The second resin layer 12 is provided on the first resin layer 11 on a side opposite to the protrusion layer 2 side. The second resin layer 12 may be provided on a part of the first resin layer 11, and it is preferable that the second resin layer 12 is provided on at least a part of the protrusion layer. FIG. 2, FIG. 3, FIG. 5, FIG. 6 and FIG. 7 show an aspect in which the second resin layer 12 is provided on a part of the first resin layer 11. More specifically, FIG. 2, FIG. 3 and FIG. 7 show an aspect in which the second resin layer 12 is provided on a part of the first resin layer 11, which is also the entire surface of the protrusion layer 2, and FIG. 5 and FIG. 6 show an aspect in which the second resin layer 12 is provided on a part of the first resin layer 11, which is also a part of the protrusion layer 2. FIG. 4 shows an aspect in which the second resin layer 12 is provided on the entire surface of the first resin layer 11 on a side opposite to the protrusion layer 2 side.

By providing the second resin layer 12 on the first resin layer 11, forming a region where the first resin layer 11 containing a matting agent is exposed and a region where the first resin layer is not exposed, and causing a gloss difference to occur between the regions, high designability can be imparted to the decorative sheet of the present disclosure. From the viewpoint of obtaining more excellent designability, it is preferable that the second resin layer 12 has a higher gloss over the first resin layer 11. That is, it is preferable that the first resin layer 11 contains a matting agent and thus has a relatively low gloss, and the second resin layer 12 has a relatively high gloss, so that there is a gloss difference between the first resin layer 11 and the second resin layer 12.

Further, it is preferable that in the decorative sheet 10 of the present disclosure, the position where the protrusion layer 2 is formed and the position where the second resin layer 12 is formed are in synchronization with each other. Here, the synchronization means that the position where the protrusion layer 2 is formed and the position where the second resin layer 12 is formed are associated with each other in plan view. Specifically, (a) the second resin layer 12 is present at a position identical to that of the protrusion layer 2; (b) the second resin layer 12 is present at a position different from that of the protrusion layer 2; (c) the second resin layer 12 is present at a position away from the protrusion layer 2 with a certain distance and direction maintained from the protrusion layer; or the like, in plan view. More specifically, as shown in FIG. 3, the position where the protrusion layer 2 is formed corresponds to a convex portion on a surface of the decorative sheet 10, the second resin layer 12 is formed on the protrusion layer 2, and the first resin layer 11 is exposed at a position of a concave portion between the protrusion layers 2. Thus, the stereoscopic feeling from a combination of the visual design feeling and the touch feeling can be further improved by a gloss difference between the first resin layer 11 (low gloss) and the second resin layer 12 (high gloss). At the position where the protrusion layer 2 is formed, the second resin layer 12 may be formed in the concave portion between the protrusion layers 2 (not shown). In this case, a portion where the first resin layer 11 is exposed is present at the position of the concave portion between the protrusion layers 2.

The second resin layer 12 is preferably a resin layer having transparency. The term "transparent" includes any of the terms "colorless and transparent", "colored transparent", "translucent" and the like.

Examples of the resin that forms the second resin layer 12 include phenol resins, urea resins, diallyl phthalate, melamine resins, guanamine resins, unsaturated polyester resins, polyurethane resins, epoxy resins, aminoalkyd resins, melamine-urea co-condensates, silicone resins, polysiloxane, polyethylene terephthalate, polybutylene terephthalate, polyamide, polyethylene, polypropylene, ethylene-vinyl acetate copolymers, ethylene-acrylic acid copolymers, ethylene-acrylic acid ester copolymers, ionomers, polymethylpentene, acrylic acid esters, methacrylic acid esters, polycarbonate and cellulose triacetate. In addition, the above-described ionizing radiation curable resin may be used. These resins can be used alone or in combination of two or more thereof.

The second resin layer 12 can contain a matting agent for adjusting the gloss. When the second resin layer 12 contains a matting agent, the content of the matting agent in the second resin layer 12 is preferably smaller than the content of the matting agent in the first resin layer 11. When the content of the matting agent in the second resin layer 12 is smaller than the content of the matting agent in the first resin layer 11, the gloss of the second resin layer 12 is made higher than the gloss of the first resin layer 11, so that it is easy to obtain excellent designability.

Examples of the matting agent which is used for the second resin layer 12 include the same as those listed for the first resin layer 11. The added amount of the matting agent is preferably 0.5 to 20 mass %, more preferably 1 to 15 mass % based on the resin composition (excluding the solvent) that forms the second resin layer 12. The content of the matting agent in the second resin layer 12 being smaller than the content of the matting agent in the first resin layer 11 means that the mass of the matting agent contained per unit mass of the solid content of the resin composition forming the second resin layer 12 is smaller than the mass of the matting agent contained per unit mass of the solid content of the resin composition forming the first resin layer 11.

When the later-described pattern layer 3 is present in the decorative sheet 10 of the present disclosure, it is preferable that the second resin layer 12 is provided in synchronization with the pattern of the pattern layer 3. A configuration in which the pattern of the pattern layer 3 and the pattern of the second resin layer 12 are in synchronization with each other ensures that a decorative sheet having more excellent designability can be obtained. In the present disclosure, as synchronization of the pattern of the pattern layer 3 with the second resin layer 12, mention is made of, for example, an aspect in which a position of the pattern of the pattern layer 3 and a position where the second resin layer 12 is formed correspond to each other (so-called "positive"); and an aspect in which a position of the pattern of the pattern layer 3 and a position where the second resin layer 12 is not formed correspond to each other (so-called "negative"), in plan view of the decorative sheet. FIG. 3 shows a "negative" aspect as an example of synchronization of the pattern of the pattern layer 3 with the second resin layer 12. FIG. 6 shows an aspect in which the pattern of the pattern layer 3 and the second resin layer 12 are in synchronization with each other and the protrusion layers 2 and the pattern layer 3 are in non-synchronization with each other.

In the decorative sheet 10 of the present disclosure, it is preferable that the pattern layer 3 has a woody texture pattern, and the second resin layer 12 having a higher gloss over the first resin layer 11 is provided on a portion other than at least one of the thick-line pattern and the vessel pattern of the woody texture. Accordingly, the portions of the thick-line pattern and/or the vessel pattern of the woody texture have a low gloss, so that it is possible to obtain excellent designability with a great resemblance to natural wood. For forming a second resin layer as described above, it is preferable to perform printing by a known printing method using a plate in a state in which a thick-line pattern and/or a vessel pattern of the same woody texture as that of the pattern layer 3 are inverted. The printing method is preferably a gravure printing method, a screen printing method, or the like.

The second resin layer 12 may be colored, and in particular, it is desirable not to blend a colorant.

The thickness of the second resin layer is preferably about 0.1 to 20 µm, more preferably about 0.5 to 10 µm, still more preferably about 1 to 5 µm, from the viewpoint of achieving both excellent touch feeling and excellent designability.

When the decorative sheet 10 of the present disclosure is used for injection molding or vacuum molding, it is preferable to use the polycarbonate (meth)acrylate as the ionizing radiation curable resin forming the second resin layer 12 from the viewpoint of enhancing the scratch resistance and improving the three-dimensional moldability of the decorative sheet 10. As the polycarbonate (meth)acrylate, the same polycarbonate (meth)acrylate as exemplified in the section [Protrusion layer 2] can be used.

In addition, when the decorative sheet 10 of the present disclosure is used for injection molding or vacuum molding, it is preferable to form the second resin layer 12 from a mixture of an ionizing radiation curable resin and a thermoplastic resin from the viewpoint of enhancing the scratch resistance and improving the three-dimensional moldability of the decorative sheet 10. The type of the thermoplastic resin and the preferable mixing ratio of the ionizing radiation curable resin and the thermoplastic resin can be the same as those described in the section [First resin layer 11].

[Third Resin Layer 13]

The third resin layer 13 is a layer provided on the protrusion layers 2 on a side opposite to the first resin layer 11 side (the lower side of the protrusion layers 2) if necessary for the purpose of, for example, improving the chemical resistance of the decorative sheet. Specifically, in the protrusion layers 2 containing particles, the presence of the particles may cause a chemical to easily permeate through the protrusion layers 2. Then, for example, when the later-described pattern layer 3 or the like is provided on the lower side of the protrusion layers 2, a chemical may permeate the pattern layer 3 or the like, leading to deterioration of the chemical resistance of the decorative sheet. By providing the third resin layer 13 between the protrusion layer 2 and the pattern layer 3, permeation of a chemical into the pattern layer 3 can be suppressed.

The third resin layer 13 is provided on the lower side of at least a part of the protrusion layers 2. The third resin layer 13 is provided preferably on the lower side of the entire surface of the protrusion layer 2, or on the entire surface on one side of the decorative sheet (i.e. full solid layer). FIG. 7 shows an aspect in which the third resin layer 13 is provided on the entire surface on one surface side of the decorative sheet. The third resin layer 13 is preferably in contact with the protrusion layers 2. When the decorative sheet 10 has the pattern layer 3, the third resin layer 13 is preferably in contact with the protrusion layer 2 and the pattern layer 3.

Examples of the resin that forms the third resin layer 13 include phenol resins, urea resins, diallyl phthalate, melamine resins, guanamine resins, unsaturated polyester resins, polyurethane resins, epoxy resins, aminoalkyd resins, melamine-urea co-condensates, silicone resins, polysiloxane, polyethylene terephthalate, polybutylene terephthalate, polyamide, polyethylene, polypropylene, ethylene-vinyl acetate copolymers, ethylene-acrylic acid copolymers, ethylene-acrylic acid ester copolymers, ionomers, polymethylpentene, acrylic acid esters, methacrylic acid esters, polycarbonate and cellulose triacetate.

In addition, the third resin layer 13 may be formed using an ionizing radiation curable resin. Examples of details of the ionizing radiation curable resin include the same as those described in detail in the section [Protrusion layer 2].

The thickness of the third resin layer 13 is, for example, preferably about 2 to 10 μm, more preferably about 0.1 to 20 μm, still more preferably about 0.3 to 10 μm, even more preferably about 0.5 to 5 μm in consideration of chemical resistance and the like.

[Pattern Layer 3]

The pattern layer 3 is a layer provided under the protrusion layers 2 if necessary for the purpose of imparting decorativeness to the decorative sheet. The protrusion layers 2 and the pattern layer 3 may be in contact with each other, or may be laminated with the later-described primer layer etc. interposed therebetween.

The pattern layer 3 can be, for example, a layer in which a desired picture is formed using an ink composition. As the ink composition which is used for forming the pattern layer 3, one obtained by appropriately mixing a binder with a colorant such as a pigment or a dye, an extender pigment, a solvent, a stabilizer, a plasticizer, a catalyst, a curing agent and the like is used.

The binder which is used for the ink composition is not particularly limited, and examples thereof include polyurethane resins, vinyl chloride-vinyl acetate copolymers, vinyl chloride-vinyl acetate-acrylic copolymers, chlorinated polypropylene resins, acrylic resins, polyester resins, polyamide resins, butyral resins, polystyrene resins, nitrocellulose resins and cellulose acetate resins. These binders may be used alone, or may be used in combination of two or more thereof.

The colorant which is used for the ink composition is not particularly limited, and examples thereof include inorganic pigments such as carbon black (black), iron black, titanium white, antimony white, yellow lead, titanium yellow, rouge, cadmium red, ultramarine and cobalt blue; organic pigments or dyes such as quinacridone red, isoindolinone yellow and phthalocyanine blue; metallic pigments composed of scaly foil pieces of aluminum, brass or the like; and pearlescent (pearl) pigments composed of scaly foil pieces of titanium dioxide-coated mica, basic lead carbonate or the like.

The picture formed by the pattern layer 3 is not particularly limited, and examples thereof include woody texture patterns, grainy patterns imitating the surface of rock, such as marble patterns (e.g. travertine marble patterns), fabric patterns imitating grains of fabric or cloth-like patterns, tiling patterns, and brick masonry patterns, and the pattern may be a pattern of a wooden mosaic, a patchwork or the like obtained by combining the above-mentioned patterns, or may be a monochromatic plain pattern (so-called full solid pattern). These pictures are formed by multicolor printing with normal process colors of yellow, red, blue and black, and can also be formed by, for example, multicolor printing with a spot color, which is performed with the preparation of plates of individual colors for forming the pattern.

The thickness of the pattern layer 3 is not particularly limited, and is, for example, 1 to 30 μm, preferably 1 to 20 μm.

The pattern layer 3 may be a thin metal film layer. Examples of the metal for forming the thin metal film layer include tin, indium, chromium, aluminum, nickel, copper, silver, gold, platinum, zinc and an alloy containing at least one of these metals. The method for forming a thin metal film layer is not particularly limited, and examples thereof include a vapor deposition method such as a vacuum vapor deposition method, a sputtering method and an ion plating method each using the above-mentioned metal. The thin metal film layer may be provided on the entire surface, or partially provided. For improving adhesion with the adjacent layer, the surface or back surface of the thin metal film layer may be provided with a primer layer using a known resin.

[Primer Layer]

The primer layer is provided under the protrusion layers 2 if necessary for the purpose of, for example, improving the adhesion of the protrusion layers 2.

From the viewpoint of improving adhesion between the protrusion layer 2 and a layer located under the protrusion layer 2, it is preferable that the primer layer is provided immediately under the protrusion layer 2. The primer layer is provided, for example, between the protrusion layer 2 and the pattern layer 3.

As the primer composition that forms the primer layer, those having a urethane resin, a (meth)acrylic resin, a (meth)acryl-urethane copolymer, a vinyl chloride-vinyl acetate copolymer, a polyester resin, a butyral resin, chlorinated polypropylene, chlorinated polyethylene or the like as a binder resin are preferably used, and these resins can be used alone or in combination of two or more thereof. Among them, urethane resins, (meth)acrylic resins and (meth)acrylic-urethane copolymers are preferable.

As the urethane resin, a polyurethane having a polyol (polyhydric alcohol) as a main agent and an isocyanate as a crosslinker (curing agent) can be used. The polyol has two or more hydroxyl groups in the molecule, and examples thereof include polyester polyol, polyethylene glycol, polypropylene glycol, acrylic polyol and polyether polyol. Examples of the isocyanate include polyvalent isocyanates having two or more isocyanate groups in the molecule; aromatic isocyanates such as 4,4-diphenylmethane diisocyanate; and aliphatic (or alicyclic) isocyanates such as hexamethylene diisocyanate, isophorone diisocyanate, hydrogenated tolylene diisocyanate and hydrogenated diphenylmethane diisocyanate. It is also possible to mix a urethane resin and a butyral resin.

From the viewpoint of adhesion with the protrusion layer 2, unlikeliness of interaction after lamination of the protrusion layer 2, physical properties and moldability, it is preferable to combine an acrylic polyol or a polyester polyol as a polyol with hexamethylene diisocyanate or 4,4-diphenylmethane diisocyanate as a crosslinker, and it is particularly preferable to use an acrylic polyol and hexamethylene diisocyanate in combination.

Examples of the (meth)acrylic resin include homopolymers of a (meth)acrylic acid ester, copolymers of two or more different (meth)acrylic acid ester monomers, and copolymers of a (meth)acrylic acid ester and another monomer, and specifically, (meth)acrylic resins composed of homopolymers or copolymers including (meth)acrylic acid esters such as polymethyl (meth)acrylate, polyethyl (meth)acrylate, polypropyl (meth)acrylate, polybutyl (meth)acrylate, methyl (meth)acrylate-butyl (meth)acrylate copolymers, ethyl (meth)acrylate-butyl (meth)acrylate copolymers, ethylene-methyl (meth)acrylate copolymers and styrene-methyl (meth)acrylate copolymers are suitably used.

As the (meth)acrylic-urethane copolymer, for example, an acryl-urethane (polyester urethane) block copolymer is preferable. As the curing agent, the above-described various isocyanates are used. It is preferable that in the acryl-urethane (polyester urethane) block copolymer, the acrylic/urethane ratio (mass ratio) is adjusted within the range of preferably 9/1 to 1/9, more preferably 8/2 to 2/8, as desired.

The thickness of the primer layer is not particularly limited, and is, for example, about 0.5 to 20 μm, preferably 1 to 5 μm.

Primer layer is formed by a normal coating method such as gravure coating, gravure reverse coating, gravure offset coating, spinner coating, roll coating, reverse roll coating, kiss coating, wheeler coating, dip coating, solid coating with a silk screen, wire bar coating, flow coating, comma coating, pour coating, blushing or spray coating, or a transfer coating method using a primer composition. Here, the transfer coating method is a method in which a coating film of a primer layer or adhesive layer is formed on a thin sheet (film base material), and thereafter the surface of the intended layer in the decorative sheet is coated with the coating film

[Masking Layer]

The masking layer is a layer which is provided, if necessary, between the base material layer 1 and the protrusion layers 2, or between the base material layer 1 and the pattern layer 3 when the pattern layer 3 is provided, for the purpose of suppressing a change or variation in color of the base material layer 1.

The masking layer is provided for inhibiting the base material layer 1 from adversely affecting the color tone and the picture of the decorative sheet, and therefore is generally formed as an opaque layer.

The masking layer is formed using an ink composition obtained by appropriately mixing a binder with a colorant such as a pigment or a dye, an extender pigment, a solvent, a stabilizer, a plasticizer, a catalyst, a curing agent and the like. The ink composition that forms the masking layer is appropriately selected from those used for the above-described pattern layer 3 and used.

It is desirable that the masking layer be normally set to have a thickness of about 1 to 20 μm, and formed as a so-called solid print layer.

The masking layer may be formed by a normal printing method such as gravure printing, offset printing, silk screen printing, printing by transfer from a transfer sheet, or inkjet printing; a normal coating method such as gravure coating, gravure reverse coating, gravure offset coating, spinner coating, roll coating or reverse roll coating; or the like.

[Back Adhesive Layer]

The back adhesive layer is a layer which is provided on a side opposite to the outer surface of the decorative sheet if necessary for the purpose of improving adhesion with the molded resin during formation of the decorative resin molded article.

For the back adhesive layer, a thermoplastic resin or a curable resin is used depending on a molded resin which is used for the decorative resin molded article.

Examples of the thermoplastic resin which is used for forming the back adhesive layer include acrylic resins, acryl-modified polyolefin resins, chlorinated polyolefin resins, vinyl chloride-vinyl acetate copolymers, thermoplastic urethane resins, thermoplastic polyester resins, polyamide resins and rubber-based resins. These thermoplastic resins may be used alone, or may be used in combination of two or more thereof.

Examples of the thermosetting resin which is used for forming the back adhesive layer include urethane resins and epoxy resins. These thermosetting resins may be used alone, or may be used in combination of two or more thereof.

2. Method for Producing Decorative Sheet

The above-described decorative sheet 10 of the present disclosure can be produced by a method including the step of laminating layers on one surface of the base material layer 1 so as to obtain a laminate in which at least the base material layer 1, the protrusion layer 2 and the first resin layer 11 are laminated in this order. The components to be used for formation of the layers, the thickness, and specific conditions for the methods for forming the layers, and the like are as described in the sections for the compositions of the layers. As described above, the second resin layer 12, the pattern layer 3, the primer layer, the masking layer, the back adhesive layer and the like can be laminated on the decorative sheet 10 if necessary.

3. Decorative Resin Molded Article

Figure 8:
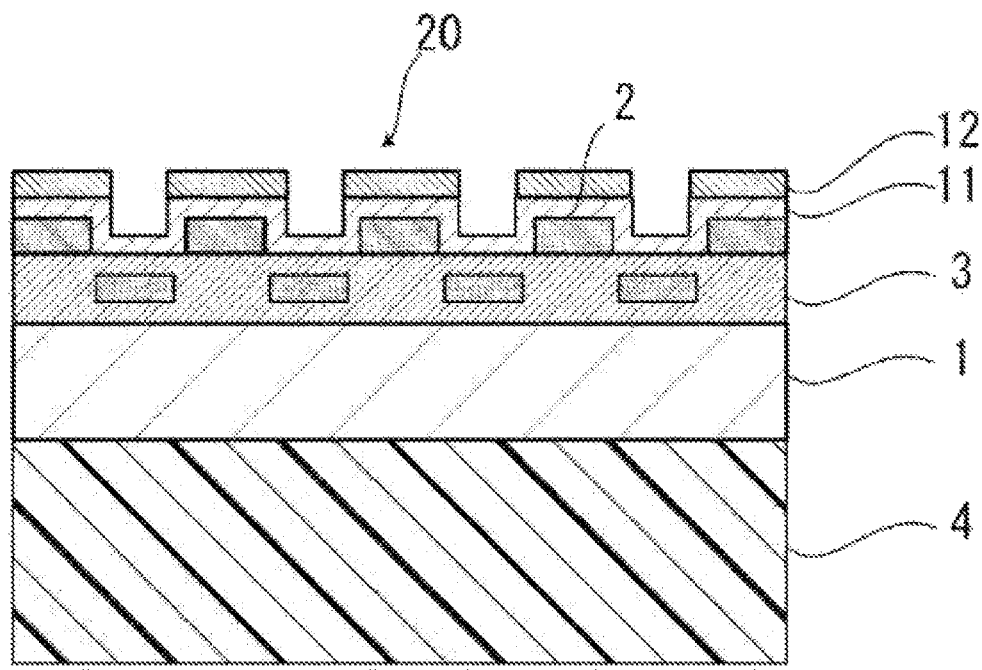
FIG. 8 is a schematic sectional view of an example of a decorative resin molded article in which the decorative sheet of the present disclosure is used.

A decorative resin molded article 20 of the present disclosure is formed by integrating a molded resin with the decorative sheet of the present disclosure. That is, as shown in the schematic view of FIG. 8, the decorative resin molded article 20 of the present disclosure includes at least the molded resin layer 4, the base material layer 1, the protrusion layer 2 and the first resin layer 11 in this order, the first resin layer 11 containing a matting agent, the protrusion layer 2 containing particles. A surface on one side of the decorative resin molded article 20 of the present disclosure has an irregularity shape. In the decorative resin molded article 20 of the present disclosure, at least one layer of the second resin layer 12, the pattern layer 3, the primer layer, the masking layer, the back adhesive layer and the like may be further provided if necessary.

The decorative resin molded article of the present disclosure is prepared by, for example, various injection molding methods such as an insert molding method, an injection molding simultaneous decorating method, a blow molding method and a gas injection molding method using the decorative sheet of the present disclosure. In the present disclosure, the decorative sheet of the present disclosure is subjected to any of various injection molding methods to prepare a decorative resin molded article, and thus excellent adhesion between the decorative sheet and the molded resin layer can be exhibited. Among these injection molding methods, an insert molding method and an injection molding simultaneous decorating method are preferable.

In the insert molding method, first, the decorative sheet of the present disclosure is vacuum molded (off-line premolding) into a molded article surface shape in advance using a vacuum molding die, and an unnecessary portion is then trimmed off if necessary to obtain a molded sheet in a vacuum molding step. The molded sheet is inserted into an injection molding die, the injection molding die is clamped, the fluidized resin is injected into the die and solidified, and the decorative sheet is integrated with the outer surface of the resin molded product in parallel to the injection molding to produce a decorative resin molded article.

More specifically, the decorative resin molded article of the present disclosure is produced by an insert molding method including the following steps:

a vacuum molding step of molding the decorative sheet of the present disclosure into a three-dimensional shape using a vacuum molding die in advance;

a trimming step of trimming an unnecessary portion of the vacuum-molded decorative sheet to obtain a molded sheet; and an integration step of inserting the molded sheet into an injection molding die, closing the injection molding die, and injecting a fluidized resin into the injection molding die to integrate the resin and the molded sheet.

In the vacuum molding step in the insert molding method, the decorative sheet may be heated and molded. The heating temperature at this time is not particularly limited, and may be appropriately selected depending on the type of resin for forming the decorative sheet, the thickness of the decorative sheet, and the like. For example, when an ABS resin film is used for the base material layer 1, the heating temperature can be normally set to about 120 to 200° C. In the integration step, the temperature of the fluidized resin is not particularly limited, and can be normally set to about 180 to 320° C.

In the injection molding simultaneous decorating method, the decorative sheet of the present disclosure is disposed in a female die also serving as a vacuum molding die, which is provided with a suction hole for injection molding, premolding (in-line premolding) is performed with the female die, the injection molding die is then clamped, the fluidized resin is injected and filled into the die, and solidified to integrate the decorative sheet of the present disclosure with the outer surface of the resin molded product in parallel to the injection molding, thereby producing a decorative resin molded article.

More specifically, the decorative resin molded article of the present disclosure is produced by an injection molding simultaneous decorating method including the following steps:
  a preliminary molding step of preliminarily molding a decorative sheet by placing the decorative sheet of the present disclosure in such a manner that a base material layer 1 side of the decorative sheet faces a molding surface of a movable die with the molding surface having a predetermined shape, followed by heating and softening the decorative sheet, and vacuum-sucking the decorative sheet from the movable die side to bring the softened decorative sheet into close contact with the movable die along the molding surface thereof;
  an integration step of clamping the movable die with the decorative sheet brought into close contact with the movable die along the molding surface thereof and a fixed die, injecting and filling the fluidized resin into a cavity formed by both the dies, and thereby solidifying the resin to form a resin molded product, and integrating the resin molded product with the decorative sheet; and
  separating the movable die from the fixed die to take out the resin molded product in which the entire decorative sheet is laminated.

The heating temperature in the preliminary molding step in the injection molding simultaneous decorating method is not particularly limited, may be appropriately selected depending on the type of resin for forming the decorative sheet, the thickness of the decorative sheet, and the like, and can be normally set to about 70 to 130° C. when a polyester resin film or an acrylic resin film is used for the base material layer 1. In the injection molding step, the temperature of the fluidized resin is not particularly limited, and can be normally set to about 180 to 320° C.

The decorative resin molded article of the present disclosure can also be produced by a decoration method including bonding the decorative sheet of the present disclosure onto a three-dimensional resin molded product (molded resin layer 4) prepared in advance, such as a vacuum press-bonding method. In the vacuum press-bonding method, first the decorative sheet of the present disclosure and the resin molded product are placed in a vacuum press-bonding machine including a first vacuum chamber situated on the upper side and a second vacuum chamber situated on the lower side in such a manner that the decorative sheet is on the first vacuum chamber side and the resin molded body is on the second vacuum chamber side, and the base material layer 1 side of the decorative sheet faces the resin molded body side. The two vacuum chambers are then evacuated. The resin molded body is placed on a lift table that is provided on the second vacuum chamber side and is capable of moving up and down. Then, the first vacuum chamber is pressurized, and the molded body is pressed against the decorative sheet with the lift table, and by using a pressure difference between the two vacuum chambers, the decorative sheet is bonded to the surface of the resin molded body while being stretched. Finally, the two vacuum chambers are released to atmospheric pressure, and an unnecessary portion of the decorative sheet is trimmed off if necessary, whereby the decorative resin molded article of the present disclosure can be obtained.

Preferably, the vacuum press-bonding method includes the step of heating the decorative sheet for softening the decorative sheet to improve the moldability thereof before the step of pressing the molded product against the decorative sheet. The vacuum press-bonding method including such a step may be referred to particularly as a vacuum heating and press-bonding method. The heating temperature in the step is not particularly limited, may be appropriately selected depending on the type of resin for forming the decorative sheet, the thickness of the decorative sheet, and the like, and can be normally set to about 60 to 200° C. when a polyester resin film or an acrylic resin film is used for the base material layer 1.

In the decorative resin molded article of the present invention, a resin appropriate to an intended use may be selected to form the molded resin layer 4. The molding resin for forming the molded resin layer 4 may be a thermoplastic resin or may be a thermosetting resin.

Specific examples of the thermoplastic resin include polyolefin-based resins such as polyethylene and polypropylene, ABS resins, styrene resins, polycarbonate resins, acrylic resins and vinyl chloride-based resins, and among them, ABC resins are preferable because of particularly excellent adhesion with the base material layer 1. These thermoplastic resins may be used alone, or may be used in combination of two or more thereof.

Examples of the thermosetting resin include urethane resins and epoxy resins. These thermosetting resins may be used alone, or may be used in combination of two or more thereof.

The decorative resin molded article of the present disclosure can be used for, for example, interior materials or exterior materials of vehicles such as automobiles; fittings such as window frames and door frames; interior materials of buildings such as walls, floors and ceilings; housings of household electric appliances such as television receivers and air conditioners; and containers etc.

EXAMPLES

Hereinafter, the present disclosure will be described in detail by way of examples and comparative examples. It is to be noted that the present disclosure is not limited to examples.

Production of Decorative Sheet

Example 1

A black ABS raw film was prepared as a base material layer, and a 1 μm-thick all-colored layer (masking layer) and a 4 μm-thick pattern layer having a woody texture pattern were sequentially applied by gravure printing using an ink with a colorant blended in a copolymer of vinyl chloride and vinyl acetate. As the woody texture pattern, a pattern was formed in such a manner that the thick-line woody texture portion was dark in color.

Subsequently, using an ink containing a resin composition A "70 mass % of a difunctional urethane acrylate having a polycarbonate backbone (weight average molecular weight: 30,000) and 30 mass % of urethane beads (average particle diameter: 20 μm and particle diameter: 5 to 60 μm (90% of of all the organic particles have particle diameter within the range of a particle diameter of 5 to 60 μm)) as organic particles", coating was performed by protrusion printing using a pattern plate with a plate depth of 90 μm to partially form a protrusion layer (thickness: 20 μm) on the pattern layer. The protrusion layer was formed such that the protrusion pattern was a woody texture pattern, and the area ratio of the protrusion layer to one surface of the base material layer was 25%.

Subsequently, using an ink containing 70 mass % of a difunctional urethane acrylate having a polycarbonate backbone (weight average molecular weight: 30,000) and 30 mass % of silica particles (average particle diameter: 2 μm) as a matting agent, gravure printing (full solid printing) was performed on the entire surface from above the protrusion layer to form a 5 μm-thick first resin layer. The first resin layer was set so as to have a gloss of 1.0 (60° gloss).

Subsequently, using an ink containing 6 mass % of silica particles (average particle diameter: 2 μm) as a matting agent and 94 mass % of a difunctional urethane acrylate (weight average molecular weight: 30,000) having a polycarbonate backbone, a 2 μm-thick second resin layer was formed by performing gravure printing in a pattern which was identical to the woody texture pattern of the pattern layer except that the thick-line portion was not present and which was in synchronization with the woody texture pattern. The second resin layer was set so as to have a gloss of 10.0 (60° gloss).

Finally, the surface was irradiated with an electron beam having an accelerating voltage of 165 kV and an irradiation dose of 50 kGy (5 Mrad) to cure the ionizing radiation curable resin, thereby obtaining a decorative sheet.

Example 2

Except that with respect to the formation of the protrusion layer in Example 1, an ink containing a resin composition B "70 mass % of a difunctional urethane acrylate having a polycarbonate backbone (weight average molecular weight: 30,000) and 30 mass % of urethane beads (average particle diameter: 15 μm and particle diameter: 4 to 50 μm) as organic particles", instead of the resin composition A was used, and coating was performed by protrusion printing using a pattern plate with a plate depth of 70 μm to partially form a protrusion layer (thickness: 15 μm) on the pattern layer, the same procedure as in Example 1 was carried out to obtain a decorative sheet.

Example 3

Except that with respect to the formation of the protrusion layer in Example 1, the protrusion layer was formed such that the area ratio of the protrusion layer to one surface of the base material layer was 15%, the same procedure as in Example 1 was carried out to obtain a decorative sheet.

Example 4

Except that with respect to the formation of the protrusion layer in Example 1, the protrusion layer was formed such that the area ratio of the protrusion layer to one surface of the base material layer was 5%, the same procedure as in Example 1 was carried out to obtain a decorative sheet.

Example 5

Except that with respect to the formation of the protrusion layer in Example 1, the protrusion layer was formed such that the area ratio of the protrusion layer to one surface of the base material layer was 3%, the same procedure as in Example 1 was carried out to obtain a decorative sheet.

Example 6

Except that with respect to the formation of the protrusion layer in Example 1, the protrusion layer was formed such that the area ratio of the protrusion layer to one surface of the base material layer was 35%, the same procedure as in Example 1 was carried out to obtain a decorative sheet.

Example 7

Except that with respect to the formation of the protrusion layer in Example 1, an ink containing a resin composition C "70 mass % of an ionizing radiation curable resin including pentaerythritol triacrylate and a thermoplastic resin (homopolymer of methyl methacrylate, weight average molecular weight: 100,000) (pentaerythritol triacrylate:thermoplastic resin=30:70 (mass ratio)) and 30 mass % of urethane beads (average particle diameter: 20 μm and particle diameter: 5 to 60 μm) as organic particles", instead of the resin composition A was used, and coating was performed by protrusion printing using a pattern plate with a plate depth of 90 μm to partially form a protrusion layer (thickness: 20 μm) on the pattern layer, the same procedure as in Example 1 was carried out to obtain a decorative sheet.

Example 8

Except that with respect to the formation of the protrusion layer in Example 1, an ink containing a resin composition D "70 mass % of a difunctional urethane acrylate having a polycarbonate backbone (weight average molecular weight: 30,000) and 30 mass % of urethane beads (average particle diameter: 10 μm and particle diameter: 3 to 40 μm) as organic particles", instead of the resin composition A was used, and coating was performed by protrusion printing using a pattern plate with a plate depth of 50 μm to partially form a protrusion layer (thickness: 10 μm) on the pattern layer, the same procedure as in Example 1 was carried out to obtain a decorative sheet.

Example 9

Except that with respect to the formation of the protrusion layer in Example 1, an ink containing a resin composition E "70 mass % of a difunctional urethane acrylate having a polycarbonate backbone (weight average molecular weight: 30,000) and 30 mass % of urethane beads (average particle diameter: 50 μm and particle diameter: 10 to 80 μm) as organic particles", instead of the resin composition A was used, and coating was performed by protrusion printing using a pattern plate with a plate depth of 90 μm to partially form a protrusion layer (thickness: 50 μm) on the pattern layer, the same procedure as in Example 1 was carried out to obtain a decorative sheet.

Example 10

Except that with respect to the production of the decorative sheet in Example 1, a third resin layer was laminated on the pattern layer, the same procedure as in Example 1 was carried out to obtain a decorative sheet. Formation of the third resin layer was performed as follows. Using an ink containing 70 mass % of a difunctional urethane acrylate having a polycarbonate backbone (weight average molecular weight: 30,000) and 30 mass % of silica particles (average particle diameter: 2 μm) as a matting agent, gravure printing (full solid printing) was performed on the entire surface from above the pattern layer to form a 5 μm-thick third resin layer. On the third resin layer, a protrusion layer, a first resin layer and a second resin layer were formed in the same manner as in Example 1.

Reference Example 1

Except that the protrusion layer was provided on the second resin layer rather than on the pattern layer, the same procedure as in Example 1 was carried out to obtain a decorative sheet.

Comparative Example 1

Except that with respect to the formation of the protrusion layer in Example 1, an ink containing a resin composition F free of particles "a difunctional urethane acrylate having a polycarbonate backbone (weight average molecular weight: 10,000)", instead of the resin composition A was used, and coating was performed by screen printing using a pattern plate with a plate depth of 90 μm to partially form a protrusion layer (thickness: 20 μm) on the pattern layer, the same procedure as in Example 1 was carried out to obtain a decorative sheet.

Comparative Example 2

Except that the protrusion layer was formed with a thickness of 50 μm by protrusion printing using a pattern plate with a plate depth of 90 μm, the same procedure as in Example 1 was carried out to obtain a decorative sheet.

<Evaluation of Designability of Decorative Sheet>

In terms of a deviation from an intended design of the decorative sheet and the design feeling of the woody texture, the designability was evaluated as follows. Each decorative sheet obtained as described above was visually observed from the surface on the second resin layer side (side opposite to the base material layer), and the designability was evaluated in accordance with the following criteria. Table 1 shows the results.
A: An intended design can be attained, and an excellent design feeling as a woody texture is obtained.
B: There is a slight deviation from an intended design due to the influence of the protrusion layer, but a good design feeling as a woody texture is obtained.
C: Portions are present in which there is a deviation from an intended design due to the influence of the layering layer, but a design feeling as a woody texture is acceptable, and there is no problem in practical use.
D: There is a significant deviation from an intended design due to the influence of the layering layer, and a poor woody texture design feeling is presented.

<Evaluation of Touch Feeling of Decorative Sheet>

The touch feeling before and after molding of each decorative sheet obtained as described above was evaluated as follows.

(Touch Feeling Before Molding)

A surface on the second resin layer side (side opposite to the base material layer) in each decorative sheet obtained as described above was touched by a finger, and the touch feeling was evaluated in accordance with the following criteria. Table 1 shows the results.
A: Irregularities are clearly felt.
B: Irregularities are felt.
C: Irregularities are weakly felt, and the decorative sheet can be said to have a touch feeling.
D: Irregularities are hardly felt, and the decorative sheet cannot be said to have a touch feeling.

(Touch Feeling after Molding)

Each decorative sheet obtained as described above was heated with an infrared heater and softened until the sheet temperature reached 160° C. Subsequently, vacuum molding was performed with a vacuum molding die (maximum draw ratio: 100%) to mold the decorative sheet into an internal shape of the die. The decorative sheet after molding was cooled and then released from the die. Thereafter, the injected resin was injected into the cavity of the die to integrally mold the decorative sheet and the injected resin, and the molded product was taken out from the dies to obtain a decorative resin molded article (decorative sheet after molding). A surface on the second resin layer side (side opposite to the base material layer) in the decorative sheet after molding was touched by a finger, and the touch feeling was evaluated in accordance with the following criteria. Table 1 shows the results.
A: Irregularities are clearly felt.
B: Irregularities are felt.
C: Irregularities are weakly felt, and the decorative resin molded article can be said to have a touch feeling.
D: Irregularities are hardly felt, and the decorative resin molded article cannot be said to have a touch feeling.

<Touch Feeling after Abrasion Test>

A surface on the second resin layer side (side opposite to the base material layer) in the decorative resin molded article obtained as described above was subjected to an abrasion resistance test by a method conforming to JIS K 7204. As the test conditions, the load of each of the two abrasion wheels (CS-10F) was 500 g, and the number of rotations was 100. A surface of the abrasion test part in the decorative resin molded article after the abrasion test was touched by a finger, and the touch feeling was evaluated in accordance with the following criteria. Evaluation criteria for abrasion resistance are as follows. Table 1 shows the results.
A: Irregularities are clearly felt.
B: Irregularities are felt.
C: Irregularities are weakly felt, and the decorative resin molded article can be said to have a touch feeling.
D: Irregularities are hardly felt, and the decorative resin molded article cannot be said to have a touch feeling.

<Sunscreen Cosmetic Resistance>

0.1 g of a commercially available sunscreen cosmetic was uniformly applied to a 50 mm (length)×50 mm (width) part of the surface (on the second resin layer side (side opposite to the base material layer) of each decorative sheet obtained as described above. This decorative sheet was left standing in an oven at 55° C. for 4 hours. The decorative sheet was taken out, the surface thereof was washed, the state of the part coated with the sunscreen cosmetic (test surface) was then visually observed, and chemical resistance with respect to the sunscreen cosmetic was evaluated in accordance with the following criteria. The sunscreen cosmetic is a commercially available SPF 50 product, and contains 3% of 1-(4-methoxyphenyl)-3-(4-tert-butylphenyl)-1,3-propanedione, 10% of 3,3,5-trimethylcyclohexyl salicylate, 5% of 2-ethylhexyl salicylate and 10% of 2-ethylhexyl 2-cyano-3,3-diphenylacrylate as components. Table 1 shows the results.

A: Defects such as cracking, whitening, swelling, gloss reduction and delamination of the coating film are not observed on the test surface, and a good appearance is presented.
B: Slight whitening is observed on a part of the test surface, but there is no problem in practical use.
C: Whitening or a change in gloss is observed on a part of the test surface, but it is acceptable in practical use.
D: Marked whitening or a change is observed over the entire surface of the test surface, and there is a problem in practical use.

<Insect Repellent Resistance>

0.05 g of a commercially available insect repellent was uniformly applied to a 50 mm (length)×50 mm (width) part of the surface (on the second resin layer side (side opposite to the base material layer) of each decorative sheet obtained as described above. This decorative sheet was left standing in an oven at 55° C. for 4 hours. The decorative sheet was taken out, the surface thereof was washed, the state of the part coated with the insect repellent (test surface) was then visually observed, and chemical resistance with respect to the insect repellent was evaluated in accordance with the following criteria. The insect repellent is commercially available, and contains 25% of deet (N,N-diethyl-m-toluamide) and 75% of others as components. Table 1 shows the results.

A: Defects such as cracking, whitening, swelling, gloss reduction and delamination of the coating film are not observed on the test surface, and a good appearance is presented.
B: A slight change in gloss is observed on a part of the test surface, but there is no problem in practical use.
C: Whitening or a change in gloss is observed on a part of the test surface, but it is acceptable in practical use.
D: Marked cracking of the coating film, whitening or a change in gloss is observed over the entire surface of the test surface, and there is a problem in practical use.

TABLE 1

| | | Protrusion layer | | | | |
|---|---|---|---|---|---|---|
| | Laminated configuration of decorative sheet | Resin composition | Thickness (μm) | Material of particles | Average particle diameter of particles (μm) | Area ratio of protrusion layer to base material layer |
| Example 1 | Base material layer/pattern layer/protrusion layer/ first resin layer/second resin layer | Resin composition A | 20 | Urethane | 20 | 25% |
| Example 2 | | Resin composition B | 15 | Urethane | 15 | 25% |
| Example 3 | | Resin composition A | 20 | Urethane | 20 | 15% |
| Example 4 | | Resin composition A | 20 | Urethane | 20 | 5% |
| Example 5 | | Resin composition A | 20 | Urethane | 20 | 3% |
| Example 6 | | Resin composition A | 20 | Urethane | 20 | 35% |
| Example 7 | | Resin composition C | 20 | Urethane | 20 | 25% |
| Example 8 | | Resin composition D | 10 | Urethane | 10 | 25% |
| Example 9 | | Resin composition E | 50 | Urethane | 50 | 25% |
| Example 10 | Base material layer/pattern layer/third resin layer/ protrusion layer/first resin layer/second resin layer | Resin composition A | 20 | Urethane | 20 | 25% |
| Reference Example 1 | Base material layer/pattern layer/first resin layer/ second resin layer/protrusion layer | Resin composition A | 20 | Urethane | 20 | 25% |
| Comparative Example 1 | Base material layer/pattern layer/protrusion layer/ first resin layer/second resin layer | Resin composition F | 20 | No particles | | 25% |
| Comparative Example 2 | | Resin composition F | 50 | No particles | | 25% |

| | | Touch feeling | | | Chemical resistance | |
|---|---|---|---|---|---|---|
| | Designability | Before molding | After molding | After abrasion test | Sunscreen cosmetic resistance | Insect repellent resistance |
| Example 1 | A | A | A | B | A | B |
| Example 2 | A | A | A | B | A | B |
| Example 3 | A | A | A | B | A | B |
| Example 4 | A | B | B | C | A | B |
| Example 5 | A | C | C | C | A | B |
| Example 6 | B | A | A | B | A | B |
| Example 7 | A | A | B | C | A | B |
| Example 8 | A | C | C | C | A | B |
| Example 9 | C | B | B | B | C | C |
| Example 10 | A | A | A | B | A | A |
| Reference Example 1 | B | A | A | C | A | A |
| Comparative Example 1 | D | D | D | D | B | C |
| Comparative Example 2 | D | C | D | D | C | D |

The decorative sheets of Examples 1 to 10 each include at least a base material layer, a partially provided protrusion layer and a first resin layer in this order, the first resin layer containing a matting agent, the protrusion layer containing particles. The decorative sheets of Examples 1 to 10 were decorative sheets having both excellent touch feeling and excellent designability.

DESCRIPTION OF REFERENCE SIGNS

1: Base material layer
2: Protrusion layer
11: First resin layer
12: Second resin layer
13: Third resin layer
3: Pattern layer
4: Molded resin layer
10: Decorative sheet
20: Decorative resin molded article

The invention claimed is:

1. A decorative sheet comprising at least a base material layer, a pattern layer, a partially provided protrusion layer and a first resin layer in this order,
the first resin layer containing a matting agent,
the protrusion layer containing organic particles, and
the height of the protrusion layer is 10 μm or more and less than 50 μm,
wherein the particles contained in the protrusion layer have an average particle diameter of 15 μm or more and 60 μm or less, and
wherein the content of the organic particles contained in the protrusion layer is 10 mass % or more and 50 mass % or less based on the solid content of the resin composition forming the protrusion layers.

2. The decorative sheet according to claim 1, wherein the first resin layer is formed on the entire surface on one side of the decorative sheet.

3. The decorative sheet according to claim 2, wherein a second resin layer is provided on a side opposite to the protrusion layer side of the first resin layer.

4. The decorative sheet according to claim 2, wherein the first resin layer has a thickness of 2 μm or more and 10 μm or less.

5. The decorative sheet according to claim 1, wherein a second resin layer is provided on a side opposite to the protrusion layer side of the first resin layer.

6. The decorative sheet according to claim 5, wherein the first resin layer has a thickness of 2 μm or more and 10 μm or less.

7. The decorative sheet according to claim 1, wherein the organic particle is at least one of a urethane bead and an acrylic bead.

8. The decorative sheet according to claim 1, wherein the first resin layer has a thickness of 2 μm or more and 10 μm or less.

9. The decorative sheet according to claim 1, wherein the protrusion layer is formed from an ionizing radiation curable resin.

10. The decorative sheet according to claim 1, further comprising a primer layer between the protrusion layer and the pattern layer.

11. The decorative sheet according to claim 1, wherein the pattern layer has a thickness of 1 to 30 μm.

12. The decorative sheet according to claim 1, wherein the pattern layer contains a binder, and wherein the binder is at least one selected from the group consisting of polyurethane resins, vinyl chloride-vinyl acetate copolymers, vinyl chloride-vinyl acetate-acrylic copolymers, chlorinated polypropylene resins, acrylic resins, polyester resins, polyamide resins, butyral resins, polystyrene resins, nitrocellulose resins and cellulose acetate resins.

13. A decorative resin molded article comprising at least a molded resin layer, a base material layer, a partially provided protrusion layer and a first resin layer in this order,
the first resin layer containing a matting agent,
the protrusion layer containing organic particles, and
the height of the protrusion layer is 10 μm or more and less than 50 μm,
wherein the particles contained in the protrusion layer have an average particle diameter of 15 μm or more and 60 μm or less, and
wherein the content of the organic particles contained in the protrusion layer is 10 mass % or more and 50 mass % or less based on the solid content of the resin composition forming the protrusion layers.

* * * * *